United States Patent
Drerup et al.

(10) Patent No.: US 9,753,862 B1
(45) Date of Patent: Sep. 5, 2017

(54) HYBRID REPLACEMENT POLICY IN A MULTILEVEL CACHE MEMORY HIERARCHY

(71) Applicant: INTERNATIONAL BUSINESS MACHINES CORPORATION, Armonk, NY (US)

(72) Inventors: Bernard C. Drerup, Austin, TX (US); Guy L. Guthrie, Austin, TX (US); Jeffrey A. Stuecheli, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/333,681

(22) Filed: Oct. 25, 2016

(51) Int. Cl.
| | | |
|---|---|---|
| G06F 12/08 | (2016.01) | |
| G06F 12/122 | (2016.01) | |
| G06F 12/0804 | (2016.01) | |
| G06F 12/0811 | (2016.01) | |
| G06F 12/084 | (2016.01) | |
| G06F 12/0842 | (2016.01) | |
| G06F 12/0864 | (2016.01) | |

(52) U.S. Cl.
CPC ........ *G06F 12/122* (2013.01); *G06F 12/0804* (2013.01); *G06F 12/084* (2013.01); *G06F 12/0811* (2013.01); *G06F 12/0842* (2013.01); *G06F 12/0864* (2013.01); *G06F 2212/6042* (2013.01); *G06F 2212/69* (2013.01)

(58) Field of Classification Search
CPC ...... G06F 12/12; G06F 12/121; G06F 12/122; G06F 12/0804; G06F 12/0811; G06F 12/084; G06F 12/0842; G06F 12/0864; G06F 2212/0642; G06F 2212/69
See application file for complete search history.

(56) References Cited

U.S. PATENT DOCUMENTS

| 6,185,658 B1 | 2/2001 | Arimilli et al. |
|---|---|---|
| 6,345,344 B1 | 2/2002 | Arimilli et al. |
| 6,421,762 B1 | 7/2002 | Arimilli et al. |

(Continued)

OTHER PUBLICATIONS

Drerup et al. "Counter-based Victim Selection in a Cache Memory", U.S. Appl. No. 15/288,741, filed Oct. 7, 2016. Non-Final Office Action dated Dec. 14, 2016.
Drerup et al. "Counter-based Victim Selection in a Cache Memory", U.S. Appl. No. 15/288,741, filed Oct. 7, 2016. Notice of Allowance dated Mar. 30, 2017.

(Continued)

*Primary Examiner* — Hiep Nguyen
(74) *Attorney, Agent, or Firm* — Brian F. Russell; Steven L. Bennett

(57) ABSTRACT

A data processing system includes an upper level cache memory and a lower level cache memory employing different replacement policies. The lower level cache memory provides a respective one of a plurality of counters for each of a plurality of cache lines in a particular congruence class. The lower level cache memory initializes a counter value for a cache line in the particular congruence class that was castout from the upper level cache memory based on an indication of whether the cache line was accessed in the upper level cache memory following installation in the upper level cache memory. The lower level cache memory selects a victim cache line from among the plurality of cache lines in the particular congruence class for eviction from the lower level cache memory by reference to counter values of the plurality of counters.

13 Claims, 12 Drawing Sheets

(56) References Cited

U.S. PATENT DOCUMENTS

| | | |
|---|---|---|
| 7,472,302 B2 | 12/2008 | Hu et al. |
| 7,502,889 B2 | 3/2009 | Sistla |
| 7,844,778 B2 | 11/2010 | Shen et al. |
| 8,140,760 B2 | 3/2012 | Luick |
| 8,225,045 B2 | 7/2012 | Guthrie et al. |
| 8,429,350 B2 | 4/2013 | Luick |
| 8,806,137 B2 | 8/2014 | Rabinovitch et al. |
| 8,930,625 B2 | 1/2015 | Daly et al. |
| 8,949,540 B2 | 2/2015 | Guthrie et al. |
| 8,990,506 B2 | 3/2015 | Cherukuri et al. |
| 9,274,959 B2 | 3/2016 | Habermann et al. |
| 2006/0282620 A1 | 12/2006 | Kashyap et al. |
| 2008/0256294 A1* | 10/2008 | Gill ............... G06F 12/0897 711/117 |
| 2009/0043966 A1 | 2/2009 | Shen et al. |
| 2009/0077109 A1* | 3/2009 | Paris ............... G06F 12/0864 |
| 2010/0058006 A1* | 3/2010 | Murthy ............ G06F 17/30902 711/156 |
| 2010/0235576 A1 | 9/2010 | Guthrie et al. |
| 2011/0145506 A1 | 6/2011 | Cherukuri et al. |
| 2012/0311267 A1 | 12/2012 | Gaither et al. |
| 2012/0311269 A1 | 12/2012 | Loh et al. |
| 2013/0198435 A1 | 8/2013 | Sandadi et al. |
| 2016/0055100 A1* | 2/2016 | Loh ................ G06F 12/128 711/122 |

OTHER PUBLICATIONS

Drerup et al. "Counter-based Victim Selection in a Cache Memory", U.S. Appl. No. 15/288,767, filed Oct. 7, 2016. Non-Final Acton dated Dec. 14, 2016.

Drerup et al. "Counter-based Victim Selection in a Cache Memory", U.S. Appl. No. 15/288,767, filed Oct. 7, 2016. Notice of Allowance dated Mar. 28, 2017.

Drerup et al. "Counter-based Victim Selection in a Cache Memory", U.S. Appl. No. 15/288,792, filed Oct. 7, 2016. Non-Final Office Action dated Mar. 10, 2017.

Drerup et al. "Counter-based Victim Selection in a Cache Memory", U.S. Appl. No. 15/288,815, filed Oct. 7, 2016. Non-Final Office Action dated Mar. 9, 2017.

Wu et al., "A Comparison of Capacity Management Schemes for Shared CMP Caches", Department of Electrical Engineering, Princeton University, 2008.

Kamiyama et al., "Cache Replacement Policy Based on Server Distance", NTT Network Technology Labs, Tokyo 180-8585, 2014.

Zhao et al. "Reuse Distance Based Cache Leakage Control", School of Electronics Engineering and Conputer-Science, Peking University, 2007 p. 359.

Kharbutli et al. "Counter-Based Cache Replacement Algorithms", Proceedings of the International Conference on Computer Design, San Jose, Oct 2-5, 2005.

* cited by examiner

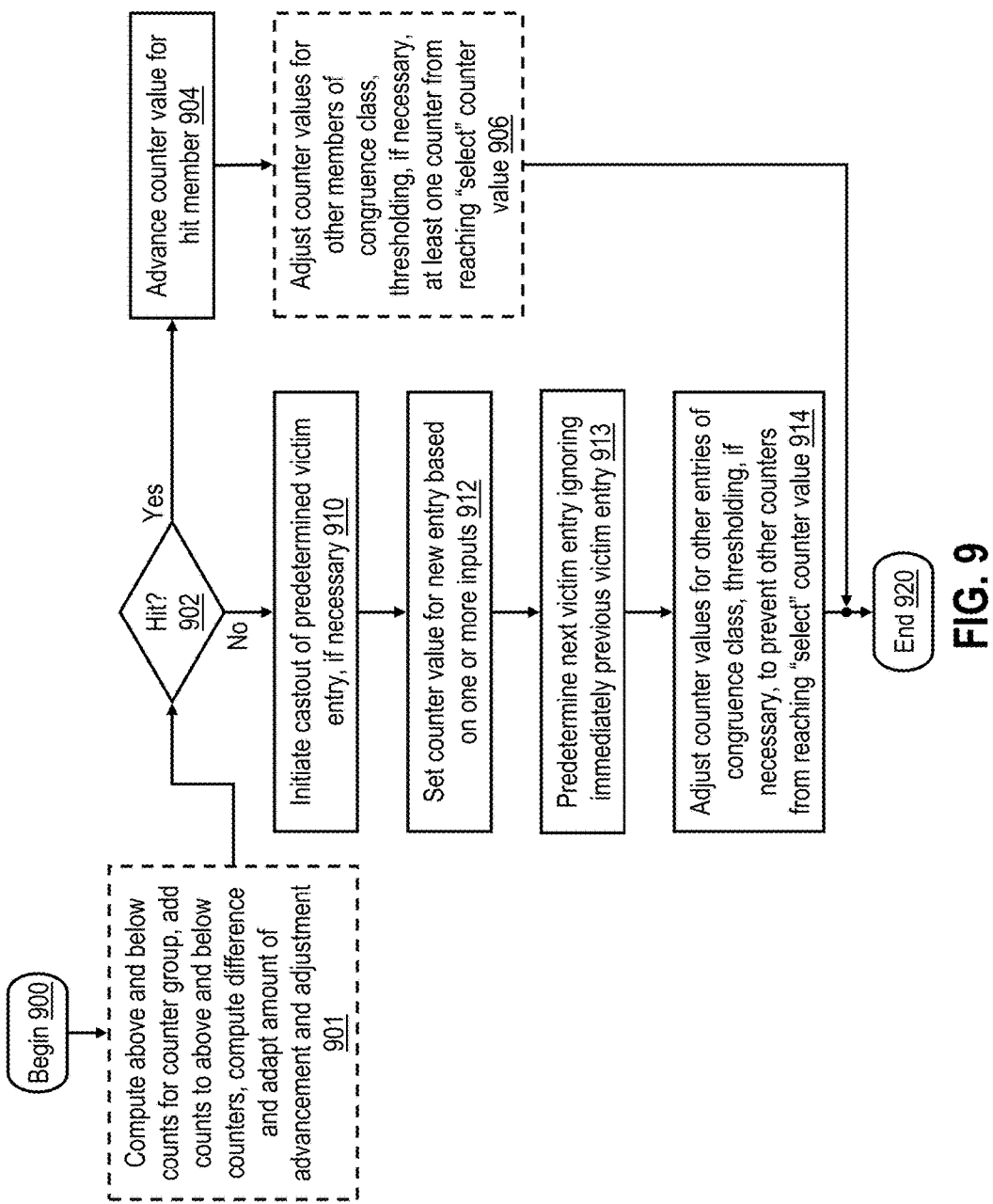

HYBRID REPLACEMENT POLICY IN A MULTILEVEL CACHE MEMORY HIERARCHY

BACKGROUND OF THE INVENTION

The present invention relates in general to data processing and, in particular, to counter-based selection of a victim for replacement from a cache memory.

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of memory in the multiprocessor computer system and which generally is accessible for read and write access by all processing units. In order to reduce access latency to instructions and data residing in the system memory, each processing unit is typically further supported by a respective multilevel cache hierarchy, the lower level(s) of which may be private to or shared by one or more processor cores.

In such systems, the caches of the processing units are typically implemented as set-associative caches, which map cache lines of data to particular congruence classes within the caches based on a predetermined set of bits within the real memory addresses of the cache lines. Each caches typically selects which of the multiple data granules in each of congruence class to evict based on a selected eviction policy, such as most recently used (MRU), least recently used (LRU) or the like.

BRIEF SUMMARY

In one embodiment, a set-associative cache memory includes a plurality of congruence classes each including multiple entries for storing cache lines of data. A respective one of a plurality of counters is maintained for each cache line stored in the multiple entries. In response to a memory access request, the cache memory selects a victim cache line stored in a particular entry of a particular congruence class for eviction from the cache memory by reference to at least a counter value of the victim cache line. The cache memory also receives a new cache line of data for insertion into the particular entry and an indication of a coherence state of the new cache line at a data source from which the cache memory received the new cache line. The cache memory installs the new cache line in the particular entry and sets an initial counter value of the counter for the new cache line based on the received indication of the coherence state at the data source.

In one embodiment, the cache memory alternatively or additionally receives in conjunction with the new cache line an indication of a distance from the cache memory to a data source from which the cache memory received the new cache line. In this embodiment, the cache memory sets the initial counter value of the counter for the new cache line based on at least the received indication of the distance.

In one embodiment, a set-associative cache memory includes a bank of counters including a respective one of a plurality of counters for each cache line stored in a plurality of congruence classes of the cache memory. Prior to receiving a memory access request that maps to a particular congruence class of the cache memory, the cache memory pre-selects a first victim cache line stored in a particular entry of a particular congruence class for eviction based on at least a counter value of the victim cache line. In response to receiving a memory access request that maps to the particular congruence class and that misses, the cache memory evicts the pre-selected first victim cache line from the particular entry, installs a new cache line in the particular entry, and pre-selects a second victim cache line from the particular congruence class based on at least a counter value of the second victim cache line.

In one embodiment, a set-associative cache memory has a plurality of congruence classes each including multiple entries for storing cache lines of data. The cache memory includes a bank of counters, which includes a respective one of a plurality of counters for each cache line stored in the plurality of congruence classes. The cache memory selects victim cache lines for eviction from the cache memory by reference to counter values of counters within the bank of counters. A dynamic distribution of counter values of counters within the bank of counters is determined. In response, an amount counter values of counters within the bank of counters are adjusted on a cache miss is adjusted based on the dynamic distribution of the counter values.

In one embodiment, a data processing system includes an upper level cache memory and a lower level cache memory employing different replacement policies. The lower level cache memory provides a respective one of a plurality of counters for each of a plurality of cache lines in a particular congruence class. The lower level cache memory initializes a counter value for a cache line in the particular congruence class that was castout from the upper level cache memory based on an indication of whether the cache line was accessed in the upper level cache memory following installation in the upper level cache memory. The lower level cache memory selects a victim cache line from among the plurality of cache lines in the particular congruence class for eviction from the lower level cache memory by reference to counter values of the plurality of counters.

All objects, features, and advantages of the present invention will become apparent in the following detailed written description.

BRIEF DESCRIPTION OF THE SEVERAL VIEWS OF THE DRAWINGS

FIG. 9 is a high level logical flowchart of an exemplary method of managing a bank of replacement logic counters in accordance with another embodiment of the present invention;

DETAILED DESCRIPTION

Figure 1:
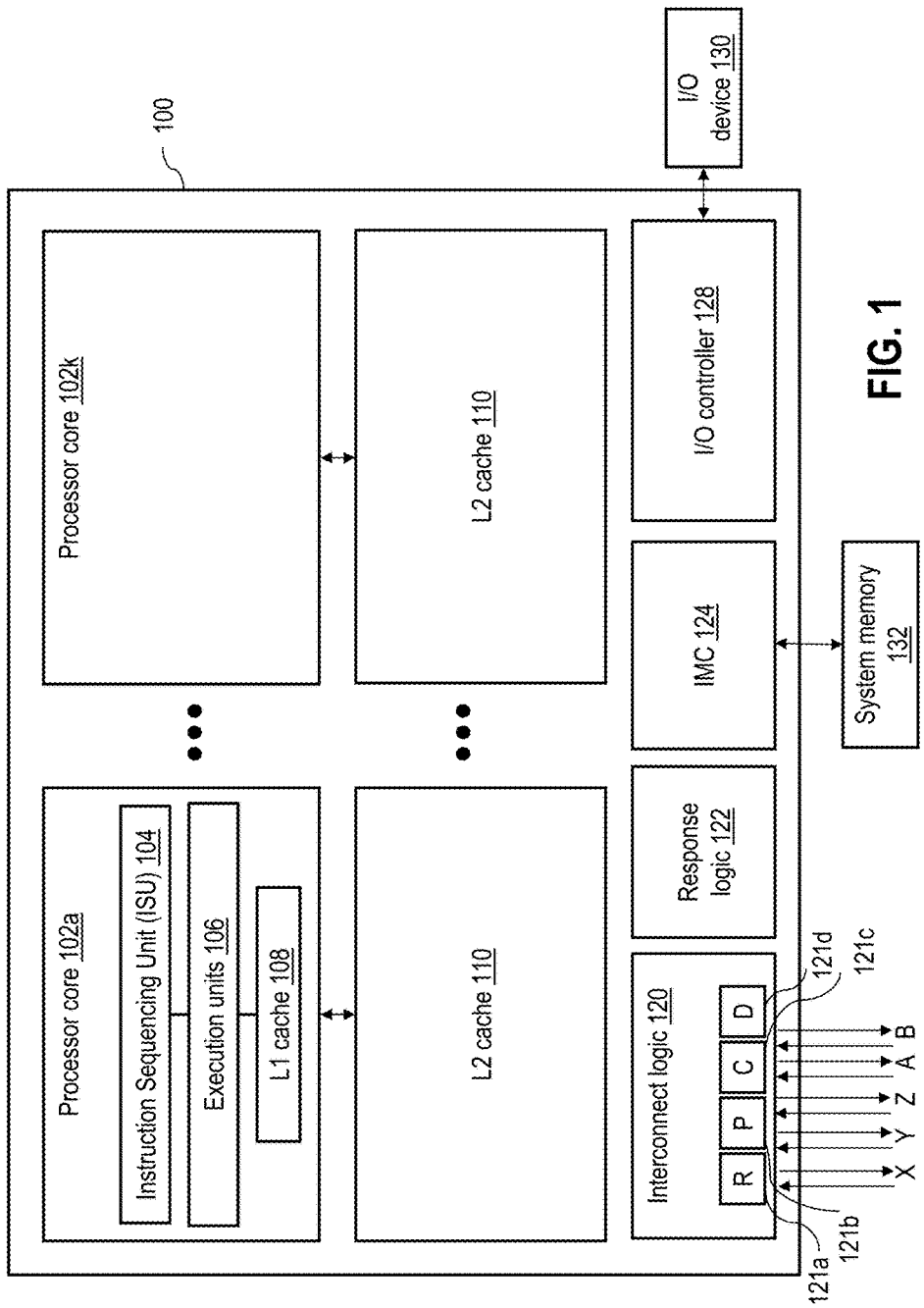
FIG. 1 is a high level block diagram of an exemplary processing unit in accordance with the present invention.

With reference now to the figures and, in particular, with reference to FIG. 1, there is illustrated a high level block diagram of an exemplary embodiment of a processing unit 100 for a multiprocessor data processing system in accordance with the present invention. In the depicted embodiment, processing unit 100 is a single integrated circuit including multiple processor cores 102a, . . . , 102k for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and memory access instructions that request read or write access to a memory block. In at least some embodiments, each processor core 102 is multithreaded and can support simultaneous execution of multiple hardware threads of execution.

The operation of each processor core 102a, . . . , 102k is supported by a multi-level memory hierarchy having at its lowest level one or more shared system memories 132 (only one of which is shown in FIG. 1). As depicted, processing unit 100 includes an integrated memory controller (IMC) 124 that controls read and write access to system memory 132 in response to requests received from processor cores 102a, 102k and operations snooped on an interconnect fabric (described below) by IMC 124.

In the illustrative embodiment, the memory hierarchy of processing unit 100 includes at its upper levels one or more levels of cache memory. In the depicted example, the cache memory hierarchy of processing unit 100 includes a store-through level one (L1) cache 108 within and private to each processor core 102a, 102k and a respective store-in level two (L2) cache 110 for each of processor cores 102. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache. Further, in some embodiments, one or more levels of cache may be shared by multiple processor cores 102. For example, in one embodiment, each vertical cache hierarchy additionally includes an L3 cache configured as a victim cache that is populated with cache lines evicted from one or more higher level L2 caches.

As further shown in FIG. 1, processing unit 100 includes integrated interconnect logic 120 by which processing unit 100 may be coupled to the interconnect fabric as part of a larger multiprocessor data processing system. In the depicted embodiment, interconnect logic 120 supports an arbitrary number t1 of "first tier" interconnect links, which in this case include in-bound and out-bound X, Y and Z links. Interconnect logic 120 further supports an arbitrary number t2 of second tier links, designated in FIG. 1 as in-bound and out-bound A and B links. With these first and second tier links, each processing unit 100 may be coupled for bi-directional communication to up to t1/2+t2/2 (in this case, five) other processing units 100. Interconnect logic 120 includes request logic 121a, partial response logic 121b, combined response logic 121c and data logic 121d for processing and forwarding information during different phases of operations on the interconnect fabric.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices 130, such as Electrically Erasable Programmable Read Only Memory (EEPROM), Field Programmable Gate Array (FPGA), etc. I/O controller 128 may issue operations and receive data on the X, Y, Z, A and B links.

Figure 2:
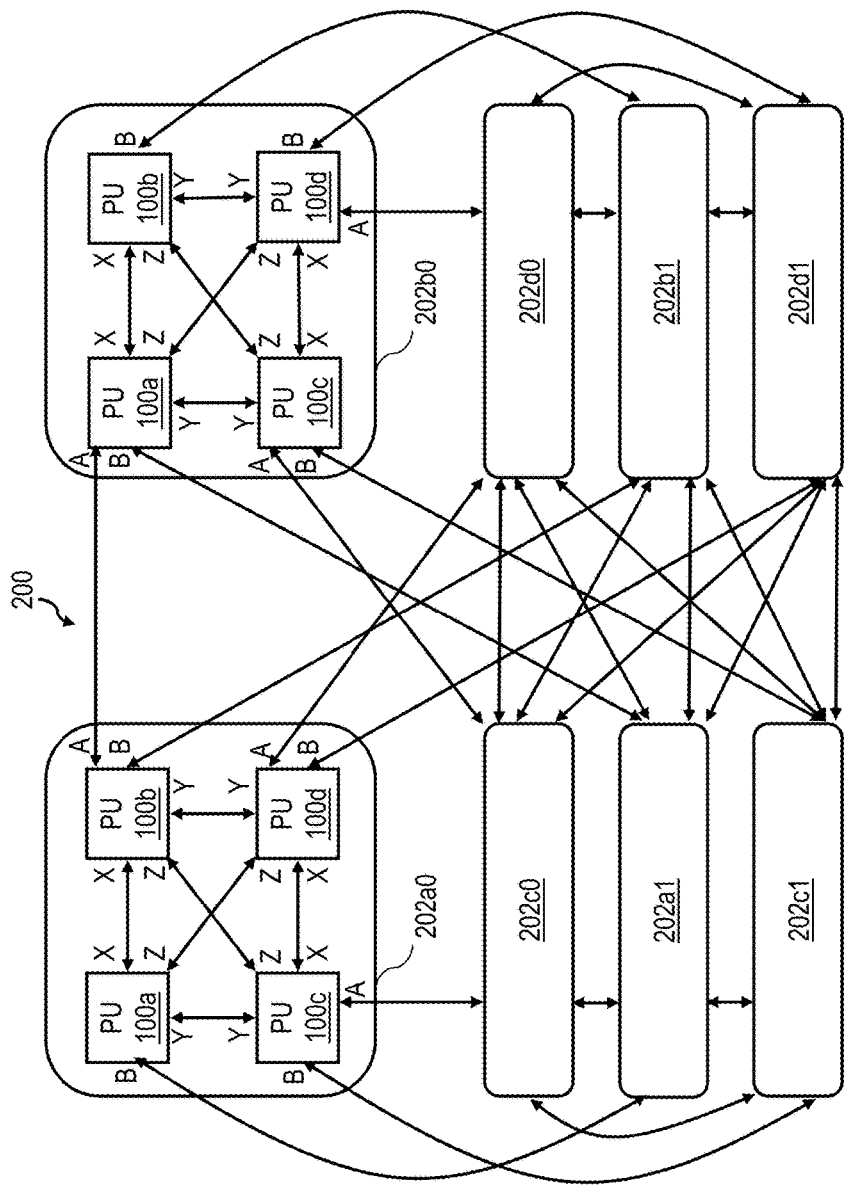
FIG. 2 is a high level block diagram of an exemplary data processing system in formed of processing units as shown in FIG. 1.

Referring now to FIG. 2, there is depicted a block diagram of an exemplary embodiment of a data processing system 200 formed of multiple processing units 100 as shown in FIG. 1. As shown, data processing system 200 includes eight processing nodes 202a0-202d0 and 202a1-202d1, which in the depicted embodiment, are each realized as a multi-chip module (MCM) comprising a package containing four processing units 100. The processing units 100 within each processing node 202 are coupled for point-to-point communication by the processing units' X, Y, and Z links, as shown. Each processing unit 100 may be further coupled to processing units 100 in two different processing nodes 202 for point-to-point communication by the processing units' A and B links. Although illustrated in FIG. 2 with a double-headed arrow, it should be understood that each pair of X, Y, Z, A and B links are preferably (but not necessarily) implemented as two uni-directional links, rather than as a bi-directional link.

General expressions for forming the topology shown in FIG. 2 can be given as follows:

Node[I][K].chip[J].link[K] connects to Node[J][K].chip[I].link[K], for all I≠J; and Node[I][K].chip[I].link[K] connects to Node[I][not K].chip[I].link[not K]; and Node[I][K].chip[I].link[not K] connects either to:
(1) Nothing in reserved for future expansion; or
(2) Node[extra][not K].chip[I].link[K], in case in which all links are fully utilized (i.e., nine 8-way nodes forming a 72-way system); and
where I and J belong to the set {a, b, c, d} and K belongs to the set {A,B}.

Of course, alternative expressions can be defined to form other functionally equivalent topologies. Moreover, it should be appreciated that the depicted topology is representative but not exhaustive of data processing system topologies embodying the present invention and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J). Moreover, in some implementations, the topology may not be fully populated in that some of processing nodes 202 or individual processing units 100 may be absent, disabled (e.g., for power management or workload reasons), or otherwise non-functional (e.g., due to a hardware error).

Even though fully connected in the manner shown in FIG. 2, all processing nodes 202 need not communicate each operation on the interconnect fabric to all other processing nodes 202. In particular, processing units 100 may broadcast operations with a scope limited to their own processing node 202 or with a larger scope, such as a system-wide scope including all processing nodes 202.

Those skilled in the art will appreciate that data processing system 200 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

Figure 3:
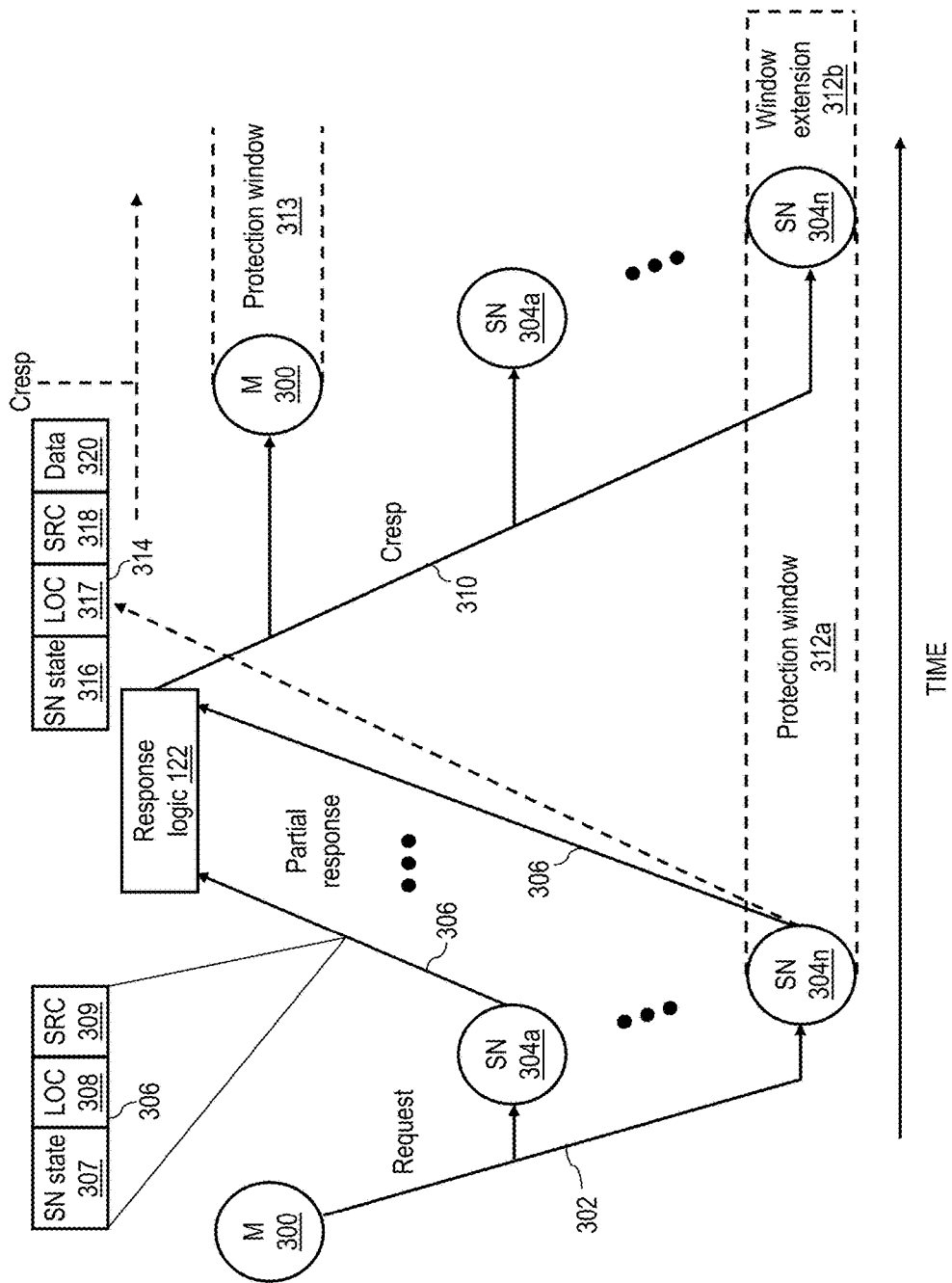
FIG. 3 is a time-space diagram of an exemplary operation on the interconnect fabric of the data processing system of FIG. 2, which includes a request phase, a partial response phase and a combined response phase.

Referring now to FIG. 3, there is depicted a time-space diagram of an exemplary operation on the interconnect fabric of data processing system 200 of FIG. 2. The operation begins when a master 300 (e.g., an L2 cache 110 or an I/O controller 128) issues a request 302 on the interconnect fabric. Request 302 preferably includes at least a transaction type (ttype) indicating a type of desired memory access and a resource identifier (e.g., target real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by snoopers 304a-304n, for example, L2 caches 110 and IMCs 124, distributed throughout data processing system 200. In general, with some exceptions, an L2 cache 110 that serves as master 300 does not also snoop the same request 302 (i.e., there is generally no self-snooping) because a request 302 is generally transmitted on the interconnect fabric only if the request 302 cannot be serviced internally by a processing unit 100. As indicated in FIG. 3, the request 302 may be received by the various snoopers 304 at different times.

Each snoopers 304 that receives and processes request 302 preferably provides a respective partial response 306 representing the response of at least that snooper 304 to request 302. An IMC 124 determines its partial response 306 to provide based, for example, upon whether the IMC 124 is responsible for the target real address specified by request 302 and whether the IMC 124 has resources available to service the request 302. An L2 cache 110 that is one of snoopers 304 may determine its partial response 306 based on, for example, the availability of its L2 cache directory 114, the availability of a snoop logic instance to handle the request, and the coherence state associated with the target real address in its directory.

FIG. 3 illustrates an exemplary format for the partial responses 306 of snoopers 304a-304n. In this example, each partial response 306 includes at least a snooper (SN) state field 307 and may optionally include one or more additional fields, such as a location (LOC) field 308 and a source type (SRC) field 309. SN state field 307 indicates the coherence state, if applicable, at the SN 304 providing the partial response 306. Because IMCs 124 have no coherence state to report, the SN state field 307 of partial responses 306 provided by IMCs 124 may be set to a predetermined value (e.g., all zeroes). LOC field 308, if present, further indicates a location of the snooper 304 within the topology of data processing system 200. In various embodiments, the location of snooper 304 can be indicated in absolute or relative terms, and further, can be specified utilizing an index to a topology data structure, which may be stored in each processing unit 102 at system bring up. For example, an absolute location can be specified by indicating an identifier of a processing node 202 and a position (A, B, C or D) of the relevant processing unit 100 within the identified processing node 202. A relative location within the topology can simply be indicated as "in node" (i.e., within the same processing node 202 as master 300) or "not in node" (i.e., within a different processing node 202 than master 300). Of course, additional levels of granularity can be employed, such as "in node group" (e.g., in the same group of two or four nodes as the master 300) and "not in node group." One advantage of this relative metric of location is that the location information can be accumulated within a partial response 306 as it traverses the interconnect fabric on its way from a snooper 304 to response logic 122 by having interconnect logic 120 set bits in partial response 306 as node or node group boundaries are crossed. SRC field 309, if present, indicates the device type (e.g., system memory 132, a cache (e.g., another L2 cache 110 or lower level cache), or I/O device 130) providing the partial response 306.

The partial responses 306 of snoopers 304 are logically combined either in stages or all at once by one or more instances of response logic 122 to determine a combined response (CR) 310 of data processing system 200 to request 302. In one preferred embodiment, which will be assumed hereinafter, the instance of response logic 122 responsible for generating combined response 310 is located in the processing unit 100 that issued request 302. Response logic 122 provides combined response 310 to master 300 and snoopers 304 via the interconnect fabric to indicate the overall response of data processing system 200 (e.g., success, failure, retry, etc.) to request 302. If the CR 310 indicates success of request 302, CR 310 may indicate, for example, a data source for a requested memory block, a cache state in which the requested memory block is to be cached by master 300, and whether "cleanup" operations invalidating the requested memory block in one or more L2 caches 110 are required. In addition, if a snooper 304 is to supply data in response to request 302, the combined response 310 may include the contents of one or more of SN state field 307, LOC field 308 and/or SRC field 309 of the snooper 304 that is designated by the combined response 310 as the data source for the requested memory block.

In response to receipt of combined response 310, one or more of master 300 and snoopers 304 typically perform one or more operations in order to service request 302. These operations may include supplying data to master 300, invalidating or otherwise updating the coherency state of data cached in one or more caches, performing castout operations, writing back data to a system memory 132, etc. If required by request 302, a requested or target memory block may be transmitted to or from master 300 before or after the generation of combined response 310 by response logic 122. As indicated in FIG. 3, if a target memory block is supplied by one of snoopers 304n to master 300 in response to request 302, the data tenure 314 includes data field 320 containing the target memory block. In addition, data tenure 314 may optionally further include a SN state field 316 indicating the coherence state, if applicable, at the SN 304n providing the target memory block, a LOC field 317 specifying the location of snooper 304n, and a SRC field 318 indicating the type of the source device. It will be appreciated that in some embodiments, the additional information indicated by fields 316-318 of data tenure 314 may be communicated to master 300 in both data tenure 314 and combined response 310, in only one of data tenure 314 and combined response 310, or partially in data tenure 314 and partially in combined response 310.

In cases like that illustrated in which data tenure 314 is received by master 300 prior to combined response 310, receiving an early indication of the coherence state in SN state field 316 enables master 300 to begin processing the target memory block prior to receipt of combined response 310 as the combined response 310 that will eventually be received can often be inferred by master 300 from the coherence state in SN state field 316.

The partial response 306 of a snooper 304 to a request 302 and the operations performed by the snooper 304 in response to the request 302 and/or its combined response 310 can be described with reference to whether that snooper 304 is a Highest Point of Coherency (HPC), a Lowest Point of Coherency (LPC), or neither with respect to the request address specified by the request 302. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the IMC 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a master 300. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the directory of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives combined response 310 and during a subsequent window extension 312b extending a programmable time beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding CRs are possible. For example, if an IMC 124 that is responsible for a requested memory block has a queue available to handle a request, the IMC 124 may respond with a partial response indicating that it is able to serve as the LPC for the request. If, on the other hand, the IMC 124 has no queue available to handle the request, the IMC 124 may respond with a partial response indicating that is the LPC for the memory block, but is unable to currently service the request. Similarly, a snooper 116 in an L2 cache 110 may require an available instance of snoop logic and access to its cache directory in order to handle a request. Absence of access to either (or both) of these resources results in a partial response (and corresponding CR) signaling an inability to service the request due to absence of a required resource.

Figure 4:
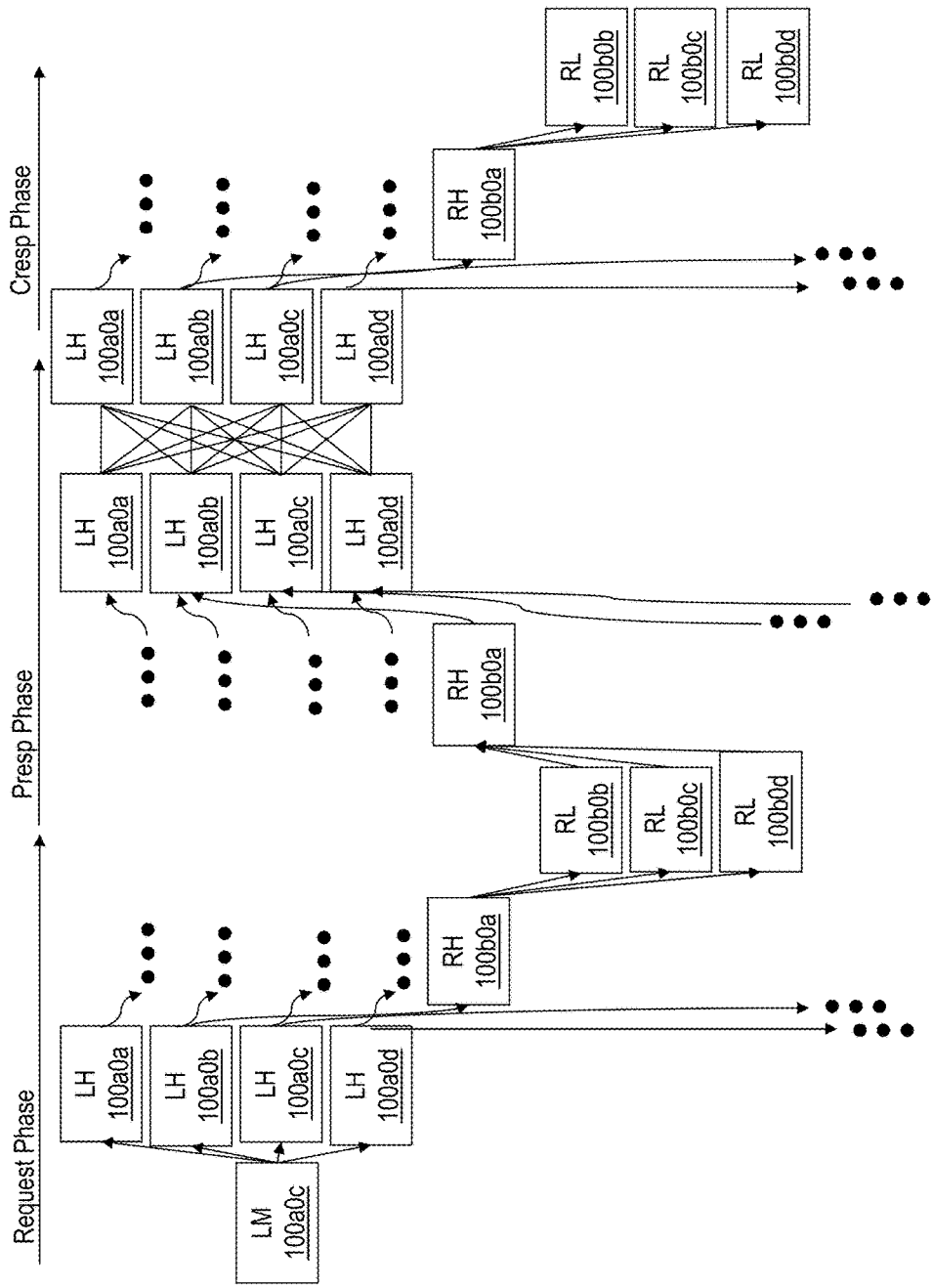
FIG. 4 is a time-space diagram of an exemplary operation of system-wide scope within the data processing system of FIG. 2.

Referring now to FIG. 4, there is illustrated a time-space diagram of an exemplary operation flow of an operation of system-wide scope in data processing system 200 of FIG. 2. In FIG. 4, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

The request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. This internal transmission is advantageously employed to synchronize the operation of local hub 100a0c with local hubs 100a0a, 100a0b and 100a0d so that the timing constraints applicable to operations on the interconnect fabric can be more easily satisfied.

In response to receiving the request, each local hub 100 that is coupled to a remote hub 100 by its A or B links transmits the operation to its remote hub(s) 100. Thus, local hub 100a0a makes no transmission of the operation on its outbound A link, but transmits the operation via its outbound B link to a remote hub within processing node 202a1. Local hubs 100a0b, 100a0c and 100a0d transmit the operation via their respective outbound A and B links to remote hubs in processing nodes 202b0 and 202b1, processing nodes 202c0 and 202c1, and processing nodes 202d0 and 202d1, respectively. Each remote hub 100 receiving the operation in turn transmits the operation to each remote leaf 100 in its processing node 202. Thus, for example, local hub 100b0a transmits the operation to remote leaves 100b0b, 100b0c and 100b0d. In this manner, the operation is efficiently broadcast to all processing units 100 within data processing system 200 utilizing transmission over no more than three links.

Following the request phase, the partial response (Presp) phase occurs. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. The broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

Response logic 122 at each local hub 100 within processing node 202a0 compiles the partial responses of the other processing units 100 to obtain a combined response representing the system-wide response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, remote hub 100a0b transmits the combined response to remote hub 100b0a, which in turn transmits the combined response to remote leaves 100b0b, 100b0c and 100b0d.

As noted above, servicing the operation may require an additional data phase. For example, if the operation is a read-type operation, such as a read or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b.

Of course, the operation depicted in FIG. 4 is merely exemplary of the myriad of possible system-wide operations that may occur concurrently in a multiprocessor data processing system such as data processing system 200.

Figure 5:
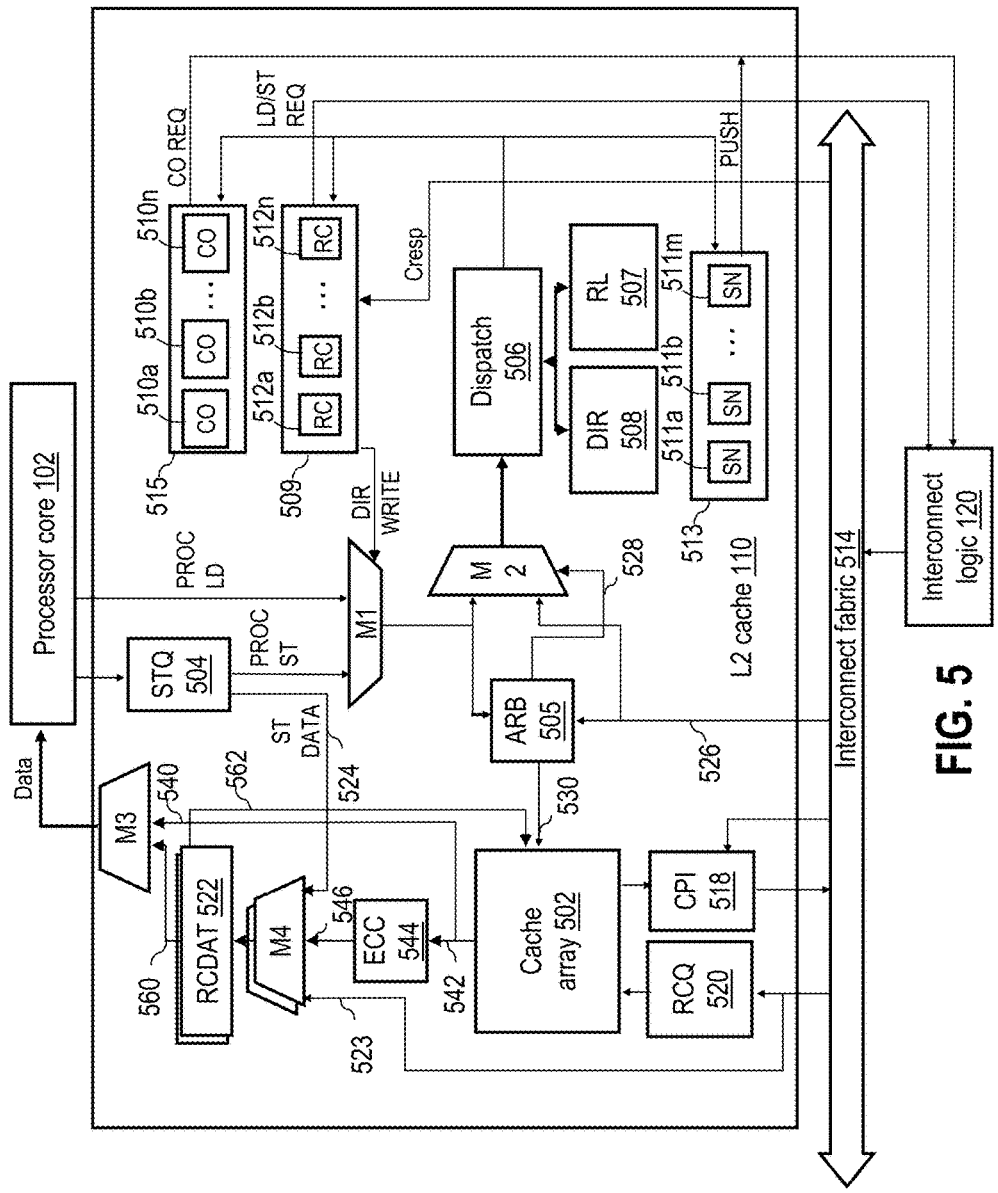
FIG. 5 illustrates an exemplary embodiment of a lower level cache, such as an L2 cache.

With reference now to FIG. 5, there is illustrated an exemplary embodiment of a lower level store-in cache (e.g., L2 cache 110) in accordance with one embodiment. In the embodiment of FIG. 5, L2 cache 110 includes a cache array 502 and a L2 directory 508 of the contents of cache array 502. Assuming cache array 502 and L2 directory 508 are set-associative as is conventional, storage locations in system memories 108 are mapped to particular congruence classes within cache array 502 utilizing predetermined index bits within system memory (real) addresses. The particular memory blocks stored within the cache lines of cache array 502 are recorded in L2 directory 508, which contains one directory entry for each cache line. While not expressly depicted in FIG. 5, it will be understood by those skilled in the art that each directory entry in cache directory 508 includes various fields, for example, a tag field that identifies the real address of the memory block held in the corresponding cache line of cache array 502, a state field that indicates the coherence state of the cache line, and inclusivity bits indicating whether the memory block is held in the associated L1 cache 212.

The replacement of cache lines from entries of cache array 502 (and replacement of associated entries in directory 508) is managed by replacement logic 507, which implements (and in some embodiments, selectively implements) a desired replacement policy, such as LRU (Least Recently Used), MRU (Most Recently Used), etc. Although replacement logic 507 is illustrated in FIG. 5 as separate from directory 508, in other embodiments replacement logic 507 can be implemented as part of directory 508. An exemplary counter-based embodiment of replacement logic 507 is described below in greater detail with reference to FIG. 6.

L2 cache 110 additionally includes an L2 STQ 504 that temporarily buffers at least store-type requests and synchronization (barrier) requests received from the associated processor core 102. In at least one embodiment, L2 STQ 504 is a unified store queue that buffers requests generated by all hardware threads of the affiliated processor core 102.

L2 cache 110 also includes snooper logic 513 including multiple (e.g., 16 or 32) snoop machines 511a-511m for servicing remote memory access requests originating from processor cores 102 other than the affiliated processor core 200. Each snoop machine 511 can independently and concurrently handle a remote memory access request "snooped" from interconnect fabric 514. As will be appreciated, the servicing of memory access requests by L2 cache 110 may require the replacement or invalidation of memory blocks within cache array 502. Accordingly, L2 cache 110 additionally includes castout logic 515 including multiple CO (castout) machines 510a-510n that manage the removal and writeback of data granules from L2 cache 110 to system memories 132. L2 cache 110 additionally includes master logic 509 including multiple (e.g., 16 or 32) read-claim (RC) machines 512a-512n for independently and concurrently servicing load-type (LD) and store-type (ST) requests received from the affiliated processor core 200.

L2 cache 110 also includes an RC queue 520 and a CPI (castout push intervention) queue 518 that respectively buffer data being inserted into and removed from the cache array 502. RC queue 520 includes a number of buffer entries that each individually correspond to a particular one of RC machines 512 such that each RC machine 512 that is dispatched retrieves data from only the designated buffer entry. Similarly, CPI queue 518 includes a number of buffer entries that each individually correspond to a particular one of the castout machines 510 and snoop machines 511, such that each CO machine 510 and each snoop machine 511 that is dispatched controls data transfer from its respective designated CPI buffer entry.

Each RC machine 512 also has assigned to it a respective one of multiple RC data (RCDAT) buffers 522 for buffering a memory block read from cache array 502 and/or received from interconnect fabric 514 via reload bus 523. The RCDAT buffer 522 assigned to each RC machine 512 is preferably constructed with connections and functionality corresponding to the memory access requests that may be serviced by the associated RC machine 512. At least some of RCDAT buffers 522 have an associated store data multiplexer M4 that selects data bytes from among its inputs for buffering in the RCDAT buffer 522 in response to unillustrated select signals.

The operation of L2 cache 110 is managed by a cache controller, which in the embodiment of FIG. 5 includes an arbiter 505 and associated selection logic represented by multiplexers M1 and M2. Multiplexer M1 orders the presentation to arbiter 505 and multiplexer M2 of load-type and store-type requests received from the associated processor core 200. Multiplexer M2 additionally receives via snoop bus 526 requests of other processor cores 200 snooped from local interconnect 114. Based on selection inputs provided by arbiter 505 determined on a desired arbitration policy, multiplexer M2 selects among the various memory access requests, including local load-type and store-type requests and remote read and write requests, presented to it, and forwards the selected requests to a dispatch pipeline 506 where each request is processed with respect to directory 508 and cache array 502 over a given number of cycles.

In operation, L2 STQ 504 receives processor store-type and barrier requests from the affiliated processor core 200. If a barrier request is received in L2 STQ 504, L2 STQ 504 may order older requests preceding the barrier request and younger requests following the barrier request. From L2 STQ 504, store data of store requests are transmitted to store data multiplexer M4 via data path 524, and store requests are passed to multiplexer M1. Multiplexer M1 also receives as inputs load requests from processor core 200 and directory write requests from RC machines 512. In response to unillustrated select signals generated by the cache controller, multiplexer M1 selects one of its input requests to forward to arbiter 505 and multiplexer M2, which additionally receives as an input remote requests received from local interconnect 514 via snoop bus 526. Arbiter 505 schedules local and remote memory access requests for processing in dispatch pipeline 506 and, based upon the scheduling, generates a sequence of select signals 528. In response to select signals 528 generated by arbiter 505, multiplexer M2 selects either a local request received from multiplexer M1 or a remote request snooped from interconnect fabric 514 as the next memory access request to be processed in dispatch pipeline 506.

Each memory access request selected for processing in dispatch pipeline 506 by arbiter 505 is placed by multiplexer M2 into dispatch pipeline 506. Dispatch pipeline 506 preferably is implemented as a fixed duration pipeline in which each of multiple possible overlapping requests is processed for a predetermined number of clock cycles. For example, dispatch pipeline 506 may process each memory access request for four cycles.

During a first cycle of processing within dispatch pipeline 506, a 1-cycle directory read is performed utilizing the request address to determine if the request address hits or misses in directory 508, and if the memory address hits, the coherence state of the memory block within directory 508. The directory information, which includes a hit/miss indication and the coherence state of the memory block, is returned by directory 508 to dispatch pipeline 506 in a subsequent cycle, such as the fourth cycle. As will be appreciated, no action is generally taken within an L2 cache 110 in response to miss on a remote memory access request; such remote memory requests are accordingly discarded from dispatch pipeline 506. However, in the event of a hit or miss on a local memory access request or a hit on a remote memory access request, L2 cache 110 will service the memory access request, which for requests that cannot be serviced entirely within processing unit 100, may entail communication on interconnect fabric 514 via interconnect logic 120.

At a predetermined time during processing of the memory access request within dispatch pipeline 506, arbiter 505 transmits the request address to cache array 502 via address and control path 530 to initiate a cache read of the memory block specified by the request address. A cache read takes 2 cycles in one exemplary embodiment. The memory block read from cache array 502 is transmitted via data path 542 to error correcting code (ECC) logic 544, which checks the memory block for errors and, if possible, corrects any detected errors. For processor load requests, the memory block is also transmitted to load data multiplexer M3 via data path 540 for forwarding to the affiliated processor core 200.

At the last cycle of the processing of a memory access request within dispatch pipeline 506, dispatch pipeline 506 make a dispatch determination. For example, dispatch pipeline 506 may make the dispatch determination based upon a number of criteria, including (1) the presence of an address collision between the request address and a previous request address currently being processed by a castout machine 510, snoop machine 511 or RC machine 512, (2) the directory information, and (3) availability of an appropriate RC machine 512, snoop machine 511 and/or CO machine 510 to process the memory access request. If dispatch pipeline 506 makes a dispatch determination that the memory access request is to be dispatched, the memory access request is dispatched from dispatch pipeline 506 to an RC machine 512 or a snoop machine 511, as appropriate. If the memory access request fails dispatch, the failure is signaled to the requestor (e.g., local or remote processor core 200) by a retry response. The requestor may subsequently retry the failed memory access request, if necessary.

While an RC machine 512 is processing a local memory access request, the RC machine 512 has a busy status and is not available to service another request. While an RC machine 512 has a busy status, the RC machine 512 may perform a directory write to update the relevant entry of directory 508, if necessary. In addition, the RC machine 512 may perform a cache write to update the relevant cache line of cache array 502. A directory write and a cache write may be scheduled by arbiter 505 during any interval in which dispatch pipeline 506 is not already processing other requests according to the fixed scheduling of directory reads and cache reads. When all operations for the given request have been completed, the RC machine 512 returns to an unbusy state.

Figure 6:
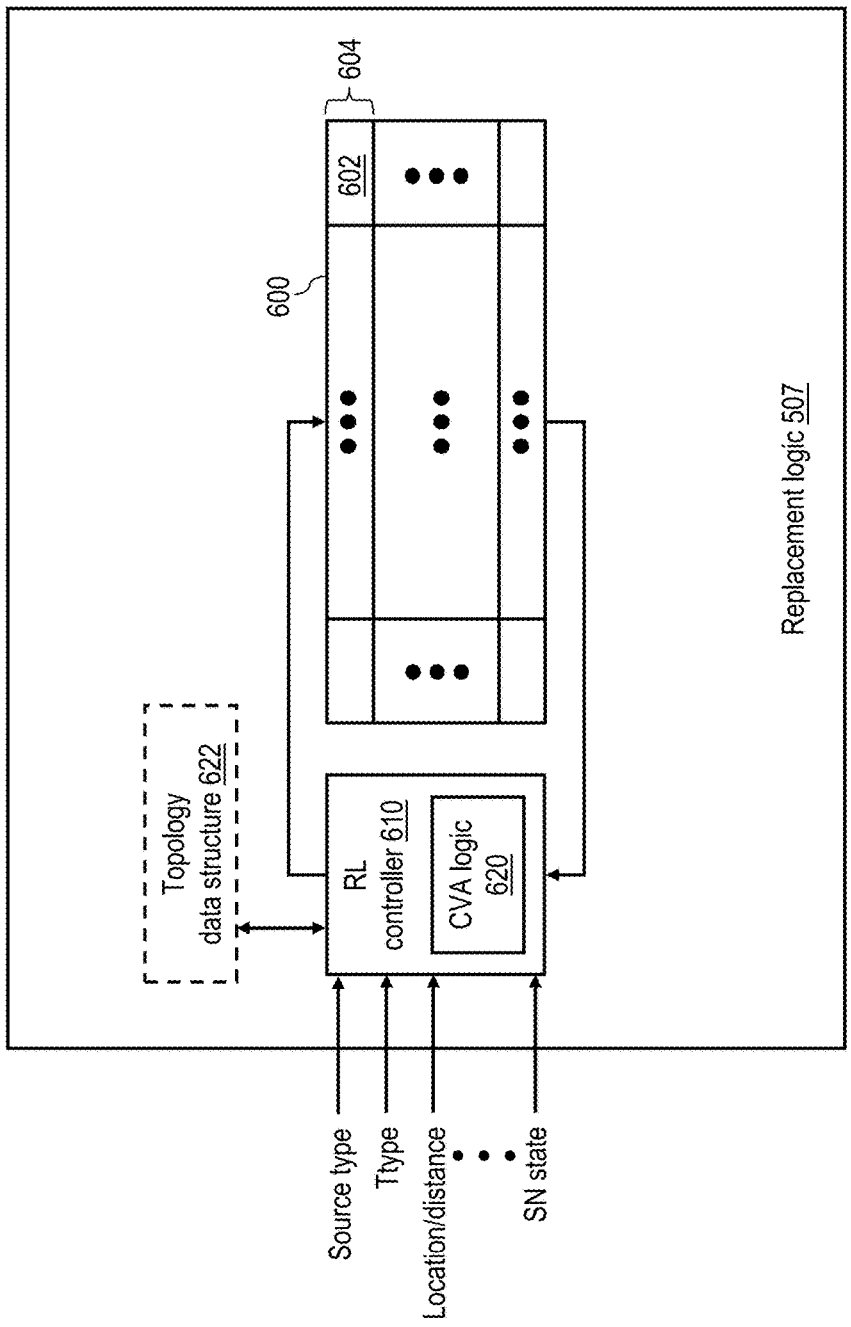
FIG. 6 is a high level block diagram of replacement logic in accordance with an embodiment of the present invention.

Referring now to FIG. 6, there is depicted a high level block diagram of replacement logic 507 in accordance with an embodiment of the present invention. In the illustrated embodiment, replacement logic 507 includes a counter bank 600, which includes a respective counter 602 (4-7 bits in one example) for each entry (and thus the cache line it contains) in cache array 502. The counters 602 corresponding to the cache entries forming a congruence class form a counter group 604 (which in an exemplary implementation may include 8 or 16 counters 602). As explained below, the counter values of the counters 602 forming a counter group 604 are utilized to select a victim cache line for eviction and replacement in the congruence class corresponding to that counter group 604.

Counter bank 600 is managed by replacement logic (RL) controller 610. RL controller 610 has a number of functions, the first of which is setting initial values of counters 602 when the associated cache lines are installed in the entries of directory 508 and cache array 502 of L2 cache 110. As indicated in FIG. 6, RL controller 610 receives one or more inputs upon which RL controller 610 can base the initial values of counters 602 set when the associated cache lines are installed in L2 cache 110. These inputs can include a source type indicating the type of source device that sourced the cache line (e.g., system memory 132, L2 cache 110, a lower level cache in the vertical cache hierarchy supporting the same processor core 102, or I/O device 130), the transaction type (ttype) by which the cache line was acquired, a location of the source device and/or the topological distance to the source device, and/or the coherence state, if any, of the cache line at the snooper that served as a data source for the cache line. A second function of RL controller 610, and specifically, of counter value adjustment (CVA) logic 620 is updating the values of counters 602 in response to accesses by the associated processor core 102 to entries of L2 cache 110. A third function of RL controller 610 is selecting and indicating a victim entry of the congruence class corresponding to each counter group 604.

As indicated by dashed line illustration, RL controller 610 may optionally further include a topology data structure 622 As discussed below, in some embodiments RL controller 610 may utilize topology data structure to determine a distance from L2 cache 110 to a snooper 304 based on a reported location of the snooper 304.

Figures 7, 8:
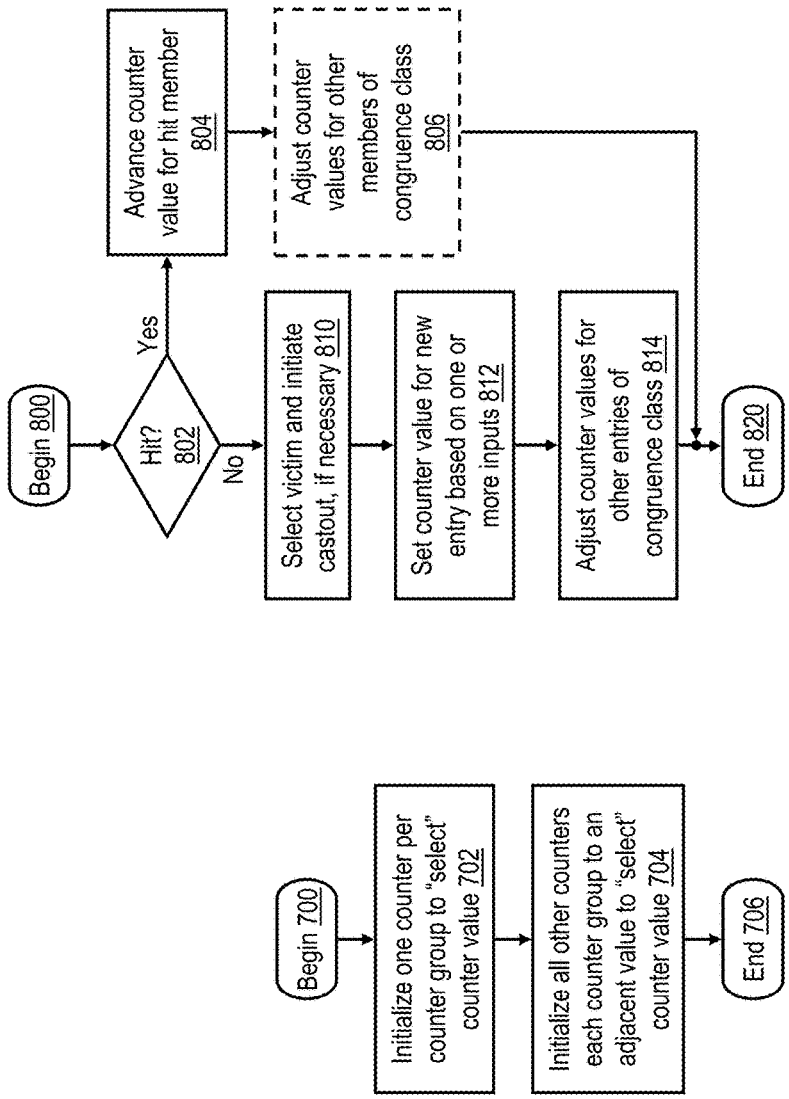
FIG. 7 is a high level logical flowchart of an exemplary method of initializing a bank of replacement logic counters corresponding to entries of the congruence classes of a set-associative cache in accordance with an embodiment of the present invention.
FIG. 8 is a high level logical flowchart of an exemplary method of managing a bank of replacement logic counters in accordance with an embodiment of the present invention.

With reference now to FIG. 7, there is illustrated a high level logical flowchart of an exemplary method of initializing a counter group 604 in accordance with an embodiment of the present invention. As with the other logical flowcharts presented herein, steps are depicted in logical rather than strictly chronological order; consequently, in some embodiments, some of the illustrated steps may be performed in a different order than illustrated or concurrently. The illustrated process may be performed by each RL controller 610, for example, during the bring up of data processing system 200.

The process begins at block 700 and then proceeds to block 702, which illustrates an RL controller 610 initializing one counter 602 in each counter group 604 to a "select" counter value, that is, a value at which the corresponding entry in cache array 502 will be selected as the next victim to be evicted from the associated congruence class. In addition, at block 704, RL controller 610 initializes all counters 602 in each counter group 604 besides those initialized at block 702 to a counter value adjacent to the "select" counter value. For example, in embodiments in which RL controller 610 uses the counter 602 having the lowest counter value in each counter group 604 to select the victim entry to be evicted from the corresponding congruence class, RL controller 610 sets counters 602 corresponding to non-victim entries to a value that is one greater than the "select" counter value. In alternative embodiments in which RL controller 610 uses the counter 602 having the highest counter value in each counter group 604 to select the victim entry to be evicted from the corresponding congruence class, RL controller 610 sets counters 602 corresponding to non-victim entries to a value that is one less than the "select" counter value. Thereafter, the process of FIG. 7 ends at block 706.

Referring to FIG. 8, there is depicted a high level logical flowchart of an exemplary method of managing a bank of replacement logic counters in accordance with an embodiment of the present invention. The depicted process can be performed, for example, by RL controller 610 to implement an LRU replacement policy.

The process of FIG. 8 begins at block 800, for example, in response to L2 cache 110 receiving a memory access request from the associated processor core 102 and processing it in dispatch pipeline 506. The process then proceeds from block 800 to block 802, which illustrates RL controller 610 determining if the target real address of the memory access request received at block 800 resulted in a hit in the local directory 508. If not (i.e., the target real address of the memory access request missed in directory 508), the process passes from block 802 to block 810, which is described below. If, however, the target real address of the memory access request hit is directory 508, the process proceeds from block 802 to block 804.

Block 804 illustrates RL controller 610 advancing the counter value of the counter 602 corresponding to the member of the congruence class for which the hit occurred. In embodiments in which RL controller 610 uses the lowest counter value to select the victim entry, advancing the counter 602 at block 804 entails increasing the counter value of the hit entry by a selected amount. In alternative embodiments in which RL controller 610 uses the highest counter value to select the victim entry, advancing the counter 602 at block 804 entails decreasing the counter value by a selected amount. As indicated at block 806 using dashed line illustration, RL controller 610 may also optionally adjust counter values of counters 602 associated with other (i.e., non-hit) entries of the congruence class in which the hit occurred. In embodiments in which RL controller 610 uses the lowest counter value to select the victim entry, adjusting the counters 602 at block 806 entails decreasing the counter values by a selected amount. In alternative embodiments in which RL controller 610 uses the highest counter value to select the victim entry, adjusting the counters 602 at block 806 entails increasing the counter values by a selected amount. The adjustment of counter values for non-hit members of the congruence class reflects the general decrease of temporal locality as time elapses. Following block 806, the process of FIG. 8 ends at block 820.

Referring now to block 810, in response to the target real address of the memory access request missing in directory 508, RL controller 610 selects a victim entry from the relevant congruence class, for example, by selecting the entry corresponding to the counter 602 with the outlying counter value in the relevant counter group 604. In embodiments in which RL controller 610 uses the lowest counter values to select the victim entry, selecting the entry with the outlying counter value entails selecting the entry corresponding to the counter 602 having the lowest value. In alternative embodiments in which RL controller 610 uses the highest counter value to select the victim entry, selecting the entry with the outlying counter value entails selecting the entry corresponding to the counter 602 having the highest value. In cases in which two or more counter values are the same, the victim entry can be selected randomly from among those entries having the common lowest (or highest) counter values. At block 810, RL controller 610 also initiates castout of the victim entry to system memory 132, if necessary, for example, by placing a castout request into dispatch pipeline 506 that will be serviced by one of castout machines 510. RL controller 610 may determine whether or not castout of the victim entry is required, for example, based on the coherence state of the victim entry indicated by directory 508. For example, in one exemplary embodiment, if the coherence state indicates that the victim entry holds a unique copy of the cache line that is modified with respect to system memory 132, RL controller 610 determines that castout is necessary, and, if the coherence state does not so indicate, RL controller 610 determines that castout is not necessary.

At block 812, RL controller 610 additionally sets the initial counter value for the new or replacement entry (which replaces the counter value of the victim entry selected at block 810) to be inserted into the congruence class in place of the victim entry. As indicated in block 812, RL controller 610 preferably determines the initial counter value for the new entry based on one or more inputs, including the transaction type (ttype) of the memory access request utilized to obtain the cache line for the new entry, the source type that responded to the memory access request to provide the cache line for the new entry (e.g., a cache at a lower level of the cache hierarchy, a cache at the same level of the cache hierarchy (e.g., another L2 cache 110), a system memory 132, an I/O device 130), a distance between the source device and the L2 cache 110, and the coherence state, if any, of the cache line at the source device.

For example, in one embodiment, RL controller 610 determines the initial counter value based either solely on the source type or based on the source type and one or more additional input(s), where the source type in indicated to L2 cache 110 by combined response 310 and/or data tenure 314. In one exemplary implementation in which the lowest counter value is utilized to select the victim entry, RL controller 610 assigns a first higher initial counter value if the source type indicates a relatively higher latency source (e.g., system memory 132/memory controller 124 or I/O device 130) and assigns a second lower initial counter value if the source type indicates a relatively lower latency source (e.g., another cache at the same level of the cache hierarchy or a lower level cache). It should be understood that although two different initial counter values are employed in this example, in other implementations additional initial counter values could be employed for selected one(s) of the source types.

As another example, in one embodiment, RL controller 610 determines the initial counter value based either solely on the transaction type or based on the transaction type and one or more additional input(s). In exemplary implementation in which the lowest counter value is utilized to select a victim entry, RL controller 610 assigns a first higher initial counter value if the transaction type is a RWITM, DCLAIM or other transaction type that requests an exclusive copy of the cache line and assigns a second lower initial counter value if the transaction type is READ or other transaction type that does not request an exclusive copy of the cache line. It should be understood that although two different initial counter values are employed in this example, in other implementations additional initial counter values could be employed for selected one(s) of the transaction types (e.g., RWITM and DCLAIM can be associated with different initial counter values).

As yet another example, in one embodiment, RL controller 610 determines the initial counter value based either solely on the distance to the source device or based on the distance and one or more additional input(s). In on exemplary implementation in which the lowest counter value is utilized to select a victim entry, RL controller 610 assigns the initial counter value based on distance measured by a number of interconnect "hops" between the source device and the processing unit 100 containing the L2 cache 110. For example, according to this measure of distance, the distance between processor unit 100*d* of processing node 202*b*0 and processing unit 100*c* of processing node 202*a*0 is 3. In some embodiments, RL controller 610 can determine the topological distance from its own known location and the source device location reported in combined response 310 and/or data tenure 314 based on distance information recorded in an optional topology data structure 622. In other embodiments, the distance can be computed elsewhere in the system (e.g., by response logic 122) and reported to RL controller 610 (e.g., in combined response 310). It should be appreciated that in some embodiments, each different distance may have its own respective initial counter value; however, in other embodiments, ranges including multiple distances may be assigned common initial counter values.

In other embodiments, replacement logic 610 can employ other metrics of distance. For example, distance can simply be "in node" (i.e., within the same processing node 202) or "not in node" (i.e., within a different processing node 202). Of course, additional levels of granularity can be employed, such as "in node", "in node group" (e.g., in a group of two or four nodes), and "not in node group." One advantage of this relative metric of distance is that the distance can be accumulated within the partial response 306 as it traverses the interconnect fabric on its way to response logic 122 by having interconnect logic 120 set bits in partial response 306 as node or node group boundaries are crossed. Consequently, RL controller 610 need not compute the distance and topology data structure 622 can be omitted.

In yet another example, RL controller 610 determines the initial counter value for the replacement entry of the congruence class based either solely on the snooper coherence state reported in combined response 310 and/or data tenure 314 or based on the snooper coherence state and one or more additional input(s). In one exemplary implementation in which the lowest counter value is utilized to select a victim entry, RL controller 610 assigns a first higher initial counter value if the snooper coherence state indicates that the snooper, prior to the memory access request, held an exclusive copy of the cache line and assigns the counter 602 a second lower initial counter value if the snooper coherence state indicates that the snooper, prior to the memory access request, did not hold an exclusive copy of the cache line. It should be understood that although two different initial counter values are employed in this example, in other implementations additional initial counter values could be employed for different ones of a plurality of possible coherence states for the cache line (e.g., for a coherence state that indicates the cache line is both modified and shared or another coherence state that indicates the cache line is a unique copy and unmodified).

Still referring to FIG. 8, at block 814 RL controller 610 adjusts counter values of counters 602 in the selected counter group 604 other than the counter 602 that was initialized at block 812. In embodiments in which RL controller 610 uses the lowest counter value in a counter group 604 to select the victim entry, adjusting the counters values at block 814 entails decreasing such counter values by a selected amount. In alternative embodiments in which RL controller 610 uses the highest counter value in a counter group 604 to select the victim entry of the corresponding congruence class, adjusting the counter values at block 814 entails increasing such counter values by a selected amount. Following block 814, the process of FIG. 8 ends at block 820.

In at least some embodiments, it is desirable to further reduce the timing impact of the determination of a victim entry to be replaced in a congruence class by removing this determination from the critical timing path between the determination that a miss has occurred in a congruence class and installation of a new entry in the congruence class. One way of reducing the timing impact of this determination is by predetermining the victim entry of a congruence class in advance of determination of a miss in the congruence class, as is discussed below with respect to FIG. 9.

With reference now to FIG. 9, there is illustrated a high level logical flowchart of an exemplary method of managing a bank of replacement logic counters in accordance with another embodiment of the present invention. The depicted process can be performed, for example, by RL controller 610 of an L2 cache 110.

The process of FIG. 9 begins at block 900, for example, in response to an L2 cache 110 receiving a memory access request from the associated processor core 102 and processing it in its dispatch pipeline 506. In some embodiments, the process passes from block 900 directly to block 902, omitting block 901. In other embodiments, the process passes to optional block 901, which is described below with to the embodiments of CVA logic 620 described below with reference to FIG. 10. Block 902 illustrates RL controller 610 determining if the target real address of the memory access request resulted in a hit in the local directory 508. If not (i.e., the target real address of the memory access request missed in directory 508), the process passes from block 902 to block 910, which is described below. If, however, the target real address of the memory access request hit in directory 508, the process proceeds to block 904.

Block 904 illustrates RL controller 610 advancing the counter value of the counter 602 corresponding to the entry of the congruence class in which the hit occurred. In embodiments in which RL controller 610 uses the lowest counter value in a counter group 604 to select a victim entry of the corresponding congruence class, advancing the counter 602 at block 904 entails increasing the counter value of the counter 602 corresponding to the hit entry by a selected amount. In alternative embodiments in which RL controller 610 uses the highest count value in a counter group 604 to select the victim entry of the corresponding congruence class, advancing the counter 602 at block 904 entails decreasing the counter value of the counter 602 corresponding to the hit entry by a selected amount. As indicated at block 906 by dashed line illustration, RL controller 610 may also optionally adjust counter values of counters 602 associated with other non-hit entries of the counter group 604 corresponding to the congruence class in which the hit occurred. In embodiments in which RL controller 610 uses the lowest counter value in the counter group 604 to select the victim entry of the corresponding congruence class, adjusting the counter values at block 906 entails decreasing the counter values by a selected amount. In alternative embodiments in which RL controller 610 uses the highest counter value in a counter group 604 to select the victim entry of the corresponding congruence class, adjusting the counter values at block 906 entails increasing the counter values by a selected amount. The adjustment of counter values for non-hit members of the congruence class reflects the general decrease of temporal locality as time elapses. In order to facilitate predetermination of a victim entry, it is preferred that, if necessary, the counter 602 of at least one non-hit entry is prevented from being adjusted to the "select" counter value at block 906. Following block 906, the process of FIG. 9 ends at block 920.

Referring now to block 910, in response to the target real address of the memory access request missing in directory 508, RL controller 610 initiates, if necessary, castout of the predetermined victim entry of the relevant congruence class to system memory 132, for example, by placing a castout request into dispatch pipeline 506 that will be serviced by one of castout machines 510. RL controller 610 may determine whether or not castout of the predetermined victim entry is required, for example, based on the coherence state of the predetermined victim entry indicated by directory 508. For example, if the coherence state indicates that the predetermined victim entry holds a unique copy of the cache line and modified with respect to system memory 132, RL controller 610 determines that a castout of the predetermined victim entry is necessary, and, if the coherence state indicates otherwise, RL controller 610 determines that a castout of the predetermined victim entry is not necessary. As noted above, by predetermining the victim entry of the congruence class, no determination of the current victim entry to be evicted need be made following the miss determination at block 902.

At block 912, RL controller 610 additionally sets the initial counter value for the counter 602 corresponding to the new or replacement congruence class entry to be inserted into the congruence class in place of the predetermined victim entry. As indicated in block 912, RL controller 610 preferably determines the initial counter value for the new entry based on one or more inputs, as discussed in detail above with reference to block 810 of FIG. 8.

The process then proceeds from block 912 to block 913, which illustrates RL controller 610 predetermining a victim entry from the relevant congruence class, for example, by selecting (in one embodiment) the entry associated with a counter 602 with an outlying counter value in the relevant counter group 604. In embodiments in which RL controller 610 uses the lowest counter value to select the victim entry, selecting the entry with the outlying counter value at block 913 entails selecting the entry corresponding to the lowest valued counter 602 of the counter group 604. In alternative embodiments in which RL controller 610 uses the highest counter values in the counter group 604 to select the victim entry, the selection depicted at block 913 entails selecting the entry corresponding to the highest valued counter 602 in the counter group 604. Again, in cases in which two or more counter values are the same, the predetermined victim can be chosen randomly from among those entries having common lowest (or highest) counter values. Once the predetermined victim entry is selected, the counter value of the corresponding counter 602 is set to the "select" value (e.g., the minimum counter value of 0b00 . . . 0).

At block 914 RL controller 610 additionally adjusts counter values of counters 602 in the counter group 604 corresponding to members of the congruence class that are neither the immediately previous victim entry that was replaced at block 912 nor the predetermined victim entry. In embodiments in which RL controller 610 uses the lowest counter value to select the victim entry, adjusting the counters 602 at block 914 entails decreasing such counter values by a predetermined amount. In alternative embodiments in which RL controller 610 uses the highest counter value to select the victim entry, adjusting the counters 602 at block 914 entails increasing such counter values by a predetermined amount. In order to facilitate predetermination of a victim entry, it is preferred that, if necessary, the counters 602 of the adjusted entries are prevented from being adjusted to the "select" counter value at block 914. Following block 914, the process of FIG. 9 ends at block 920.

Figure 10:
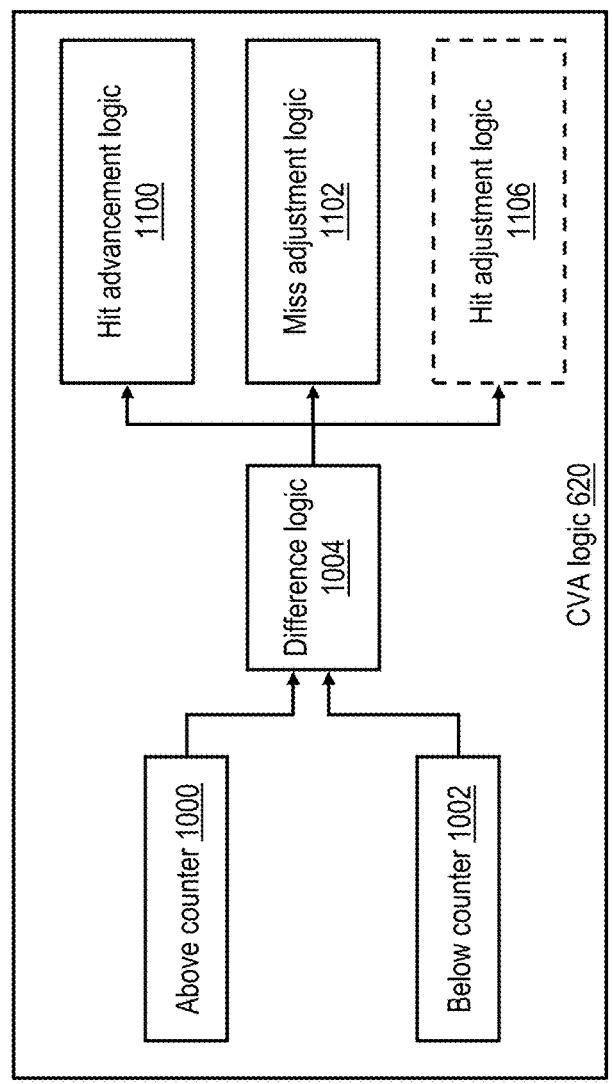
FIG. 10 is a block diagram of count value adjustment (CVA) logic in accordance with one embodiment.

Referring now to FIG. 10, there is depicted a block diagram of counter value adjustment (CVA) logic 620 in accordance with one embodiment. In this embodiment, CVA logic 620 includes an above counter 1000 and a below counter 1002, which may be, for example, between 16 and 24 bits in length. Above counter 1000 accumulates a number of counters 602 across counter bank 600 whose values are greater than a midpoint of the maximum count value that can be represented by counters 602, and below counter 1000 accumulates a number of counters 602 across counter bank 600 whose values are less than a midpoint of the maximum count value that can be represented by counters 602.

Counters 1000-1002 are coupled to difference logic 1004, which calculates the difference between the counter values of counters 1000-1002. In some embodiments, difference logic 1004 may optionally drop (i.e., truncate) a predetermined number of lower order bits (e.g., 8) prior to determining the difference in counter values. The difference between the counter values of above counter 1000 and below counter 1002 determined by difference logic 1004 provides an approximation of the distribution of the counter values within counter bank 600.

In other embodiments in which it is desirable for CVA logic 620 to determine the distribution of counter values in counter bank 600 with greater accuracy, CVA logic 620 may implement additional above and below counters for one or more counter groups 604, for example, one above counter and one below counter per counter group 604. In this case, the difference logic 1004 would compute one difference per counter group 604, thus providing a more accurate approximation of the distribution of counter values within counter bank 600.

In these various possible embodiments, each above counter 1000 and each below counter 1002 is preferably prevented for overflowing and underflowing. In one embodiment, CVA logic 620 prevents counter overflow by periodically (i.e., at even time intervals) dividing the counter values of each above counter 1000 and each below counter 1002 by a predetermined divisor, such as 2 or 4, where the result of such division is thresholded at zero to prevent underflow. In other embodiments, CVA logic 620 prevents overflow of above counter(s) 1000 and below counter(s) 1002 by alternatively or additionally dividing the counter values based on the number of times an above/below counter pair is accessed and/or based on one of the counter values of the above counter 1000 or below counter 1002 reaching a threshold value (e.g., the maximum possible counter value).

As further illustrated in FIG. 10, difference logic 1004 provides the difference it calculates to hit advancement logic 1000, miss adjustment logic 1102 and, in some embodiments, to optional hit adjustment logic 1106. Hit advancement logic 1100 determines the amount a counter value of the counter 602 corresponding to the hit entry of the congruence class is advanced at block 904 of FIG. 9, miss adjustment logic 1102 determines the amount the counters 602 corresponding to the non-hit entries of the congruence class are adjusted at block 914 of FIG. 9, and hit adjustment logic 1106, if implemented, determines the amount the counters 602 corresponding to the non-hit entries of the congruence class are adjusted at optional block 906 of FIG. 9.

Referring again to FIG. 9, at block 901 CVA logic 620 computes the number of counters 602 within the relevant counter group 604 (i.e., the one corresponding to the congruence class to which the target real address of the memory access request maps) that have counter values above the counter midpoint value and adds this number to above counter 1000. Similarly, CVA logic 620 computes the number of counters 602 within the counter group 604 that have counter values below the counter midpoint value and adds this number to below counter 1002. Based on the updated values of above counter 1000 and below counter 1002, difference logic 1004 computes a new difference that approximates the distribution of counter values across counter bank 600.

If the difference determined at block 901 indicates the counter value of above counter 1000 is greater than the counter value of below counter 1002 (or in some embodiments, greater than the counter value of below counter 1002 by at least a threshold amount), CVA logic 620 determines that counter bank 600 is skewed toward higher count values. If, on the other hand, the difference determined at block 901 indicates the counter value of above counter 1000 is less than the counter value of below counter 1002 (or in some embodiments, less than the counter value of below counter 1002 by at least a threshold amount), CVA logic 620 determines that counter bank 600 is skewed toward lower count values.

As further indicated at block 901, in response to determining that counter bank 600 is skewed either toward higher count values or toward lower count values, hit advancement logic 1100 of CVA logic 620 may adaptively change the amount by which counter values are advanced at block 904 and/or one or both of miss adjustment logic 1102 and hit adjustment logic 1106 may adaptively change the amount by which counter values are adjusted at block 914 and block 906. For example, in an embodiment in which the lowest count value in a counter group 604 is utilized to select the victim entry of the corresponding congruence class, if CVA logic 620 determines that counter bank 600 is skewed toward higher count values, hit advancement logic 1100 may decrease the amount by which a counter value is advanced at block 904 and/or one or both of miss adjustment logic 1102 and hit adjustment logic 1106 may increase the amount by which a counter value is reduced at block 914 and/or block 906. Similarly, in this embodiment, if CVA logic 620 determines that counter bank 600 is skewed toward lower count values, hit advancement logic 1100 may increase the amount by which a counter value is advanced at block 904 and/or one or both of miss adjustment logic 1102 and hit adjustment logic 1106 may decrease the amount by which a counter value is reduced at block 914 and/or block 906.

The present invention recognizes that in at least some operating scenarios, the dynamic range of counters 602 may be small enough such that, if the counters 602 are updated on all hits and on all misses, the counter values will tend to be tightly grouped at or near either the maximum or minimum counter value. In such cases, counter values will not be as effective a guide as desired in the selection of victim entries, and victim selection will, in the extreme case, tend toward being performed on a random basis. Accordingly, in at least some embodiments, it is preferred if CVA logic 620 updates counter values of counters 602 less frequently than on each memory access of the associated processor core 102. In one such embodiment, each of hit advancement logic 1100, miss adjustment logic 1102 and hit adjustment logic 1106 applies a separate probability filter that causes the counter value(s) of the relevant counters 602 to be updated less frequently than every hit or miss. In one particular example, hit advancement logic 1100 advances the counter value of the counter 602 corresponding to a hit entry every K hits, miss adjustment logic 1102 adjusts the counter values of the counters 602 corresponding to non-victim entries every L misses, and hit adjustment logic 1106, if present, adjusts the counter values of the counters 602 corresponding to non-hit entries every M hits, where K, L and M are independently adjusted integers equal or greater than 2.

Although the embodiments of FIG. 10 have been described with specific reference to the process of FIG. 9, it will be appreciated that these embodiments can additionally be employed in the process of FIG. 8.

Figure 11:
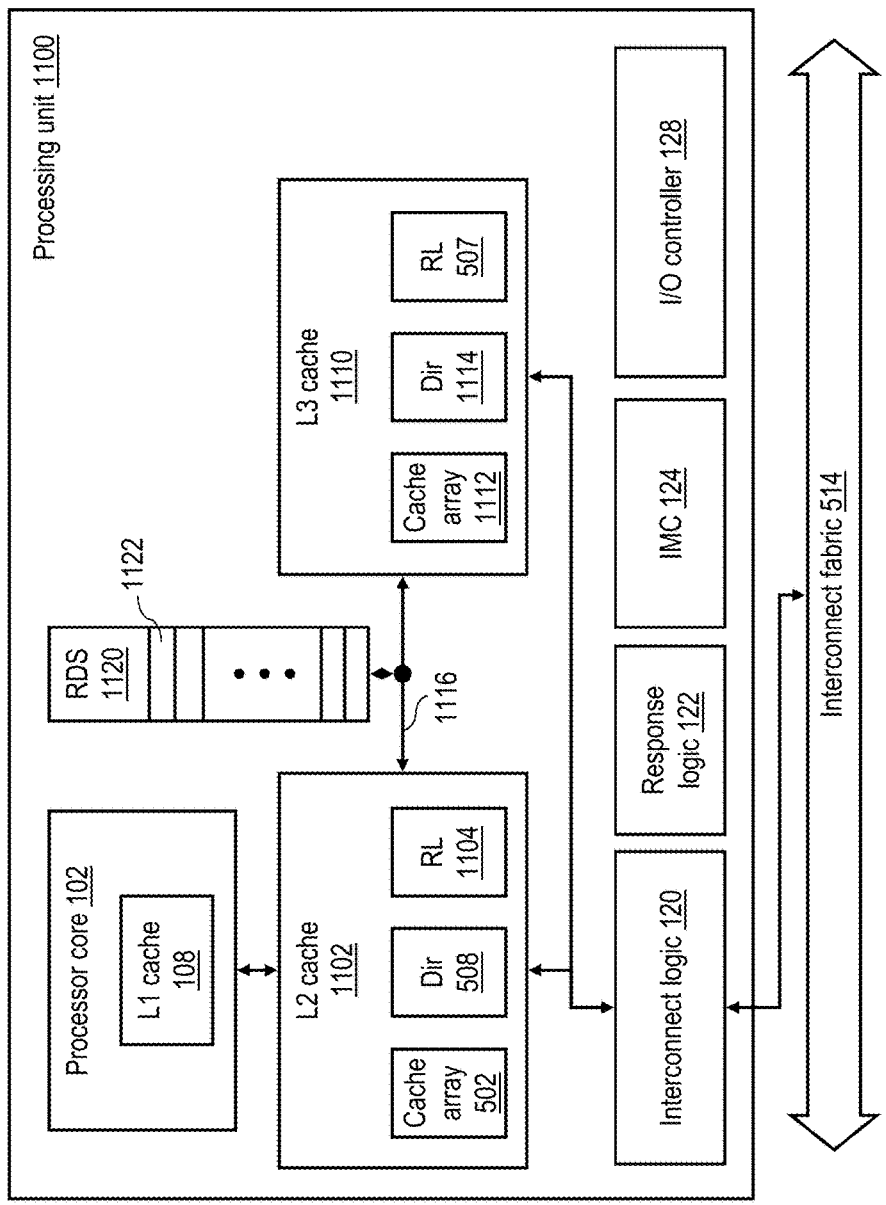
FIG. 11 is a block diagram of another embodiment of a processing unit, which includes a level three (L3) victim cache.

With reference now to FIG. 11, there is illustrated a block diagram of another embodiment of a processing unit 1100 in accordance with the present invention. The illustrated processing unit 1100 can be used to form a multiprocessor data processing system as illustrated in FIG. 2.

In the depicted embodiment, processing unit 1100 is a single integrated circuit including one or more processor cores 102 as described above. The operation of each processor core 102 is supported by a multi-level memory hierarchy having at its lowest level one or more shared system memories 132 (not illustrated in FIG. 11) accessed via IMC 124. The memory hierarchy includes at its upper levels one or more levels of cache memory, which in the depicted example include a store-through level one (L1) cache 108 within and private to each processor core 102, a respective store-in level two (L2) cache 1102 for each processor core 102, and a respective level three (L3) cache 1110 for each processor core 102. Although the illustrated cache hierarchy includes three levels of cache, those skilled in the art will appreciate that alternative embodiments may include additional levels (L4, etc.) of on-chip or off-chip in-line or lookaside cache, which may be fully inclusive, partially inclusive, or non-inclusive of the contents the upper levels of cache. Further, in some embodiments, one or more levels of cache may be shared by multiple processor cores 102.

As shown in the simplified view given in FIG. 11, L2 cache 1102 is generally constructed similarly to L2 cache memory 110 of FIG. 5 and accordingly includes a cache array 502, directory 508 and other circuitry as discussed above. However, in contrast to L2 cache 110 of FIG. 5, L2 cache 1102 of FIG. 11 does not include counter-based replacement logic 507, but instead includes replacement logic 1104 that implements a different replacement (victim selection) policy that is not counter-based. For example, in one preferred embodiment, replacement logic 1104 implements a lower latency replacement policy implemented utilizing a replacement data structure (e.g., an array of bit vectors) that is updated by lower latency set/reset accesses rather than by higher latency read-modify-write accesses.

L3 cache 1110 is preferably (but not necessarily) implemented as a lookaside cache that is non-inclusive of the content of the associated L2 cache 1102. In a particularly preferred embodiment, L3 cache 1110 is further implemented as a victim cache, which is at least partially (and possibly exclusively) populated with cache lines evicted from L2 caches 1102 located within the same or different processing units 1100. L3 cache 1110 includes a set-associative cache array 1112 and directory 1114, as well as counter-based replacement logic 507 as described above with reference to FIG. 5. L3 cache 1110 is communicatively coupled to its associated L2 cache 1102 and to a reference data structure (RDS) 1120 via a private L2-L3 interface 1116.

Reference data structure (RDS) 1120 includes a plurality of entries 1122 each associated with a respective one of the cache lines in cache array 502 of the associated L2 cache 1102. In one preferred embodiment, each entry 1122 is a single bit indicating whether or not the associated cache line has been referenced at least one additional time by the associated processor core 102 following its installation in L2 cache 1102. In other embodiments, additional bits may be implemented within entries 1122 in order to more precisely track the number of accesses to the resident cache lines by the associated processor core 102. Although illustrated separately from L2 cache 1102 and L3 cache 1110, it should be appreciated that in various embodiments RDS 1120 may be included within either L2 cache 1102 or L3 cache 1110.

As further shown in FIG. 11, processing unit 100 may additionally include interconnect logic 120 for coupling the processing unit 1100 to the interconnect fabric 514 of a multiprocessor data processing system, as well as response logic 122 and I/O controller 128 as described above.

Figure 12:
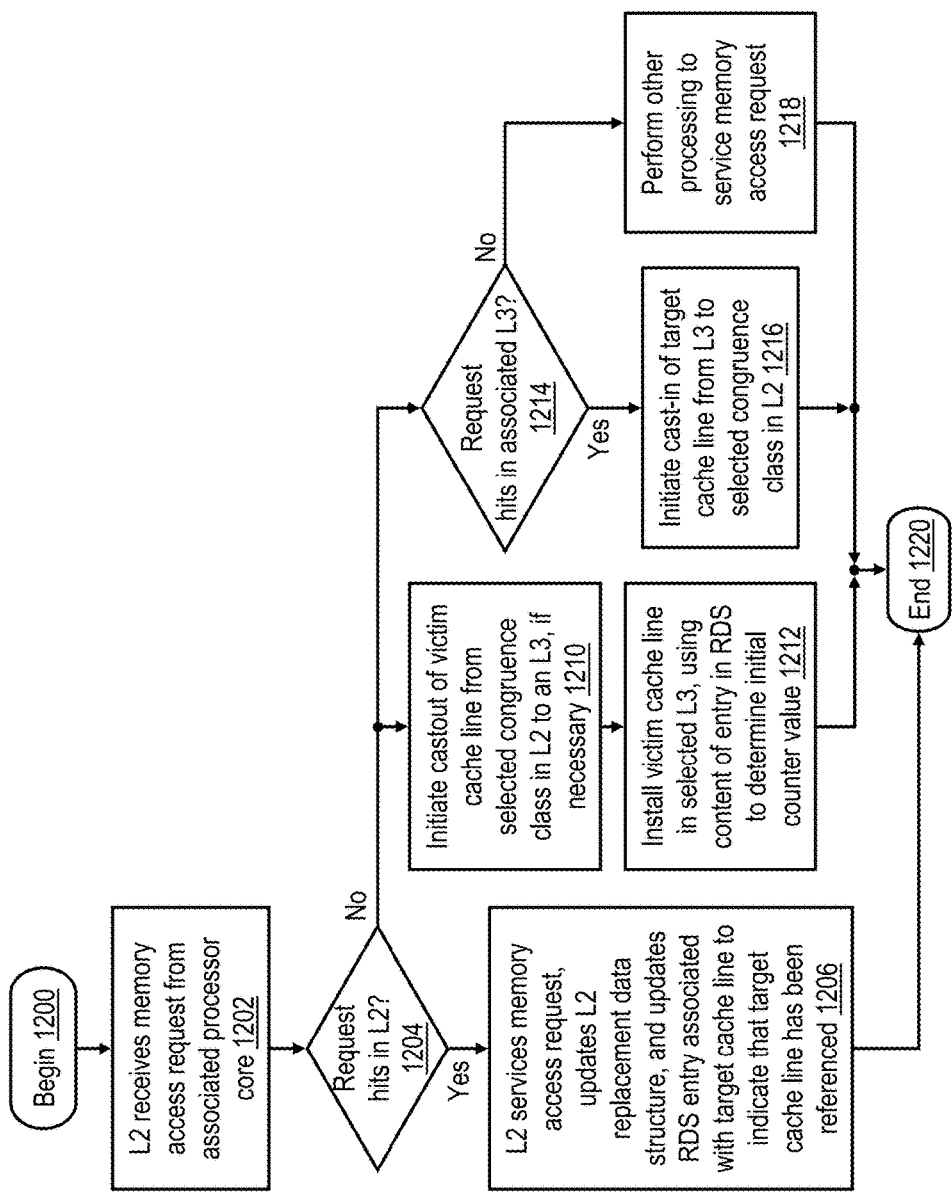
FIG. 12 is a high level logical flowchart of an exemplary method of managing victim selection in a cache hierarchy employing a hybrid replacement policy in accordance with another embodiment of the present invention.

Referring now to FIG. 12, there is depicted a high level logical flowchart of an exemplary method of managing victim selection in a multilevel cache hierarchy employing a hybrid replacement policy in accordance with another embodiment of the present invention. Although not limited to such embodiments, for ease of understanding, the process of FIG. 12 is described below with reference to the specific embodiment illustrated in FIG. 11.

The process of FIG. 12 begins at block 1200 and then proceeds to block 1202, which illustrates a L2 cache 1102 of a processing unit 1100 receiving a memory access request from the associated processor core 102 supported by that L2 cache 1102. In response to receiving the memory access request from the associated processor core 102, L2 cache 1102 determines at block 1204 whether or not the target address specified by the memory access request hits in L2 directory 508. If not, the process proceeds in parallel to both block 1210 and following blocks and block 1214 and following blocks, which are described below. If, however, L2 cache 1102 determines at block 1204 that the target address of the memory access request hits in L2 directory 508, L2 cache 1102 services the memory access request, for example, by providing data from a target cache line identified by the target address to processor core 102 or updating the target cache line, etc. (block 1206). In addition, L2 cache 1102 updates the replacement data structure in replacement logic 1104 (typically to make the target cache line less likely to be selected as the victim cache line of its congruence class). As noted above, this update is preferably performed utilizing a lower latency set or reset access rather than a higher latency read-modify-write access. As further indicated at block 1206, L2 cache 1102 additionally updates the entry 1122 in RDS 1120 corresponding to the target cache line to indicate that the target cache line has been referenced following its installation in L2 cache 1102 (e.g., by setting a bit to 1). In at least some embodiments, the update to the entry 1122 can be omitted if the relevant entry 1122 is already indicates that the target cache line has been referenced following its installation in L2 cache 1102. Following block 1206, the process of FIG. 12 ends at block 1220 until L2 cache 1102 receives a subsequent memory access request from its associated processor core 102.

Referring now to block 1210, in response to L2 cache 1102 determining that the target address of the memory access request misses in L2 cache 1102, L2 cache 1102 initiates, if necessary (e.g., if the relevant congruence class in L2 cache 1102 is presently full of valid cache lines), a castout to a selected L3 cache 1110 of a victim cache line selected from the congruence class in L2 cache 1102 to which the target address maps. The L2 cache 1102 may, for example, initiate the castout by transmitting a castout request to the selected L3 cache 1110. The selected L3 cache 1110 to which the victim cache line is castout can be, but need not necessarily be, the L3 cache 1110 associated with and directly coupled to the L2 cache 1102 by L2-L3 interface 1116. If the selected L3 cache 1110 is the one associated with the L2 cache 1102, the L2 cache 1102 may, in some embodiments, transmit the castout request to the selected L3 cache 1110 via L2-L3 interface 1116. At least in cases in which the selected L3 cache 1110 is not directly coupled to the L2 cache 1102, the L2 cache 1102 can transmit the castout request to the selected L3 cache 1110 via interconnect fabric 514.

At block 1212, the selected L3 cache 1110 responds to the castout request by evicting a victim cache line (if necessary) from the relevant congruence class of its cache array 1112, installing the victim cache line in cache array 1112, updating the corresponding entry in L3 directory 1114, and initializing the relevant counter 602 in replacement logic 507. As indicated in block 1212, the castout request sent to the selected L3 cache 1110 preferably includes the content of the entry 1122 in RDS 1120 associated with the victim cache line. The replacement logic controller 610 of the target L3 cache 1110 utilizes the content of the entry 1122 to determine the initial counter value of the counter 602 allocated to the newly installed cache line. For example, assuming that each entry 1122 includes only a single bit, replacement logic 507 preferably initializes the counter value of the counter 602 to a first counter value making the cache line less likely to be selected as a victim cache line if the value of the entry 1122 indicates that the victim cache line was referenced in L2 cache 1102 following installation and initializes the counter value of the counter 602 to a second counter value making the cache line more likely to be selected as a victim cache line if the value of the entry 1122 indicates that the victim cache line was not referenced in L2 cache 1102 following its installation in L2 cache 1102. In at least one embodiment, the first counter value is a value that makes selection of the associated cache line as the victim cache line less likely than a default counter value to which counters are generally initialized (e.g., the first counter value is greater than the default counter value). In at least one embodiment, the second counter value is a value that makes selection of the associated cache line as the victim cache line more likely than a default counter value to which counters are generally initialized (e.g., the second counter value is less than the default counter value).

Block 1214 illustrates the L3 cache 1110 associated with the processor core 102 determining whether or not the target address of the memory access request of the processor core 102 hits in L3 directory 1114. If so, the process proceeds to block 1216, which illustrates L2 cache 1102 and its associated L3 cache 1110 communicating via the L2-L3 communication interface 1116 to coordinate cast-in of the target cache line from L3 cache 1110 to a selected congruence class of L2 cache 1102 (i.e., the congruence class to which the target address of the memory access request maps). Thereafter, the process of FIG. 12 ends at block 1220 until L2 cache 1102 receives a subsequent memory access request from its associated processor core 102.

In response to determinations at block 1204 and 1214 that the target address of the memory access request misses in both L2 cache 1102 and L3 cache 1110, the process proceeds to block 1218, which depicts that other processing is performed to service the memory access request of the processor core 102. In general, servicing the memory access request at block 1218 includes transmitting the memory access request on interconnect fabric 514, L2 cache 1102 receiving a copy of the target cache line from a remote L2 cache 1102, L3 cache 1110, or system memory 132 in response to the memory access request, and L2 cache 1102 installing the target cache line. Following block 1218, the process of FIG. 12 ends at block 1220 until L2 cache 1102 receives a subsequent memory access request from its associated processor core 102.

Figure 13:
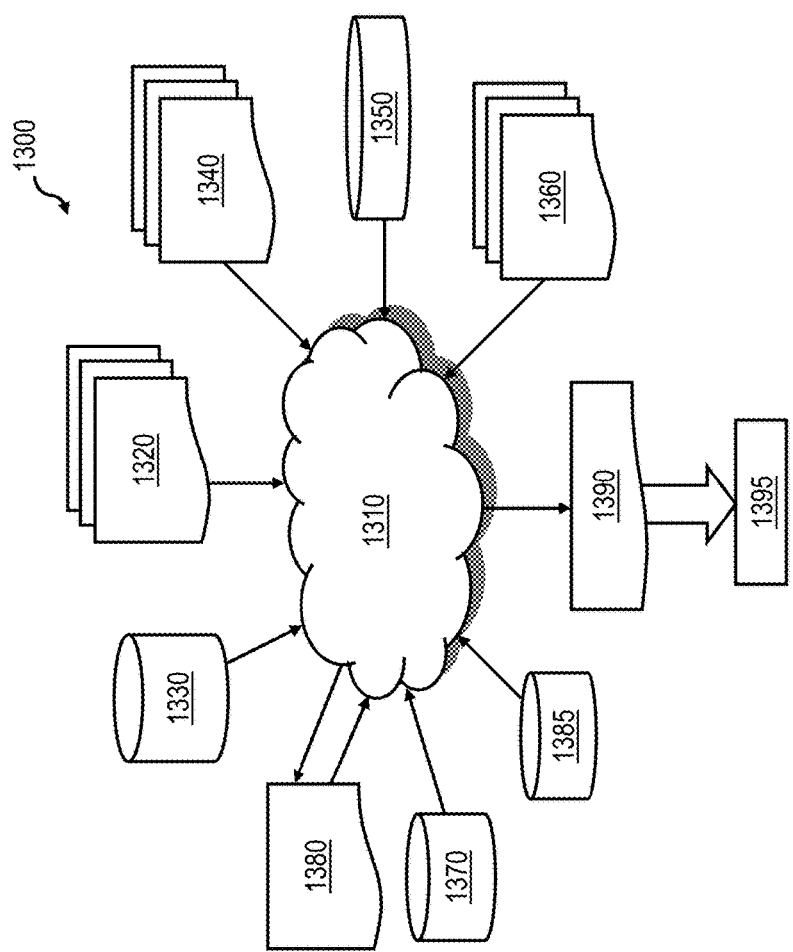
FIG. 13 illustrates an exemplary design process.

Referring now to FIG. 13, there is depicted a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of the design structures and/or devices described above and shown in the figures. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1320 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system such as those shown in the figures. As such, design structure 1320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures shown in the figures to generate a netlist 1380 which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is resynthesized one or more times depending on design specifications and parameters for the device. As with other design structure types described herein, netlist 1380 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1340, characterization data 1350, verification data 1360, design rules 1370, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390. Design structure 1390 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more of the embodiments of the invention shown in the figures. In one embodiment, design structure 1390 may comprise a compiled, executable HDL simulation model that functionally simulates the devices shown in the figures.

Design structure 1390 may also employ a data format used for the exchange of layout data of integrated circuits and/or symbolic data format (e.g., information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in the figures. Design structure 1390 may then proceed to a stage 1395 where, for example, design structure 1390: proceeds to tape-out, is released to manufacturing, is released to a mask house, is sent to another design house, is sent back to the customer, etc.

As has been described, in at least one embodiment, a set-associative cache memory includes a plurality of congruence classes each including multiple entries for storing cache lines of data. A respective one of a plurality of counters is maintained for each cache line stored in the multiple entries. In response to a memory access request, the cache memory selects a victim cache line stored in a particular entry of a particular congruence class for eviction from the cache memory by reference to at least a counter value of the victim cache line. The cache memory also receives a new cache line of data for insertion into the particular entry and an indication of a coherence state of the new cache line at a data source from which the cache memory received the new cache line. The cache memory installs the new cache line in the particular entry and sets an initial counter value of the counter for the new cache line based on the received indication of the coherence state at the data source.

In one embodiment, the cache memory alternatively or additionally receives in conjunction with the new cache line an indication of a distance from the cache memory to a data source from which the cache memory received the new cache line. In this embodiment, the cache memory sets the initial counter value of the counter for the new cache line based on at least the received indication of the distance.

In one embodiment, a set-associative cache memory includes a bank of counters including a respective one of a plurality of counters for each cache line stored in a plurality of congruence classes of the cache memory. Prior to receiving a memory access request that maps to a particular congruence class of the cache memory, the cache memory pre-selects a first victim cache line stored in a particular entry of a particular congruence class for eviction based on at least a counter value of the victim cache line. In response to receiving a memory access request that maps to the particular congruence class and that misses, the cache memory evicts the pre-selected first victim cache line from the particular entry, installs a new cache line in the particular entry, and pre-selects a second victim cache line from the particular congruence class based on at least a counter value of the second victim cache line.

In one embodiment, a set-associative cache memory has a plurality of congruence classes each including multiple entries for storing cache lines of data. The cache memory includes a bank of counters, which includes a respective one of a plurality of counters for each cache line stored in the plurality of congruence classes. The cache memory selects victim cache lines for eviction from the cache memory by reference to counter values of counters within the bank of counters. A dynamic distribution of counter values of counters within the bank of counters is determined. In response, an amount counter values of counters within the bank of counters are adjusted on a cache miss is adjusted based on the dynamic distribution of the counter values.

In one embodiment, a data processing system includes an upper level cache memory and a lower level cache memory employing different replacement policies. The lower level cache memory provides a respective one of a plurality of counters for each of a plurality of cache lines in a particular congruence class. The lower level cache memory initializes a counter value for a cache line in the particular congruence class that was castout from the upper level cache memory based on an indication of whether the cache line was accessed in the upper level cache memory following installation in the upper level cache memory. The lower level cache memory selects a victim cache line from among the plurality of cache lines in the particular congruence class for eviction from the lower level cache memory by reference to counter values of the plurality of counters.

While various embodiments have been particularly shown and described, it will be understood by those skilled in the art that various changes in form and detail may be made therein without departing from the spirit and scope of the appended claims and these alternate implementations all fall within the scope of the appended claims. For example, although embodiments have been described with reference to an L2 cache, it should be appreciated that the described inventions can also be applied to any other level of cache memory (e.g., to an L3 victim cache). Further, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method in a data processing system including an upper level cache memory and a lower level cache memory employing different replacement policies, the method comprising:
   in the lower level cache memory, providing a respective one of a plurality of counters for each of a plurality of cache lines in a particular congruence class;
   the lower level cache memory initializing a counter value for a cache line in the particular congruence class that was castout from the upper level cache memory, wherein the initializing is performed based on an indication of whether the cache line was accessed in the upper level cache memory following installation in the upper level cache memory; and
   the lower level cache memory selecting a victim cache line from among the plurality of cache lines in the particular congruence class for eviction from the lower level cache memory by reference to counter values of the plurality of counters.

2. The method of claim 1, wherein the initializing includes:
   the lower level cache memory initializing the counter value of the cache line to a first counter value that makes the cache line less likely to be selected as the victim cache line in response to the indication indicating the cache line was accessed in the upper level cache memory following installation in the upper level cache memory; and
   the lower level cache memory initializing the counter value of the cache line to a second counter value that makes the cache line more likely to be selected as the victim cache line in response to the indication indicating the cache line was not accessed in the upper level cache memory following installation in the upper level cache memory.

3. The method of claim 1, and further comprising:
   maintaining the indication in a data structure including one entry per cache line in the upper level cache memory.

4. The method of claim 1, and further comprising implementing a non-counter-based replacement policy in the upper level cache memory.

5. The method of claim 1, wherein the lower level cache memory is a lower level victim cache.

6. The method of claim 1, wherein:
the data processing system includes first and second processing units;
the upper level cache memory is in the first processing unit; and
the lower level cache memory is in the second processing unit.

7. A processing unit for a data processing system, comprising:
a processor core;
a cache memory hierarchy coupled to the processor core, wherein the cache memory hierarchy includes an upper level cache memory and a lower level cache memory employing different replacement policies, wherein the lower level cache memory includes a cache array including a plurality of congruence classes including a particular congruence class and replacement logic including:
a plurality of counters for each of a plurality of cache lines in the particular congruence class;
a replacement logic controller configured to perform:
initializing a counter value for a cache line in the particular congruence class that was castout from the upper level cache memory, wherein the replacement logic controller initializes the counter value based on an indication of whether the cache line was accessed in the upper level cache memory following installation in the upper level cache memory; and
selecting a victim cache line from among the plurality of cache lines in the particular congruence class for eviction from the lower level cache memory by reference to counter values of the plurality of counters.

8. The processing unit of claim 7, wherein the initializing includes:
initializing the counter value of the cache line to a first counter value that makes the cache line less likely to be selected as the victim cache line in response to the indication indicating the cache line was accessed in the upper level cache memory following installation in the upper level cache memory; and
initializing the counter value of the cache line to a second counter value that makes the cache line more likely to be selected as the victim cache line in response to the indication indicating the cache line was not accessed in the upper level cache memory following installation in the upper level cache memory.

9. The processing unit of claim 7, and further comprising:
a reference data structure that maintains the indication in an entry among a plurality of entries each associated with a respective one of multiple cache lines in the upper level cache memory.

10. The processing unit of claim 7, wherein the upper level cache memory includes replacement logic that implements a non-counter-based replacement policy.

11. The processing unit of claim 7, wherein the lower level cache memory is a lookaside cache.

12. The processing unit of claim 11, wherein the lower level cache memory is a victim cache.

13. A data processing system, comprising:
a plurality of processing units in accordance with claim 7; and
an interconnect fabric coupling the plurality of processing units.

* * * * *